United States Patent
Murata et al.

(10) Patent No.: US 7,191,455 B2
(45) Date of Patent: Mar. 13, 2007

(54) DISK-TYPE RECORDING AND/OR REPRODUCING APPARATUS AND METHOD OF JUDGING DISC-SHAPED RECORDING MEDIUM OF DISC-TYPE RECORDING AND/OR REPRODUCING APPARATUS

(75) Inventors: Morihiro Murata, Saitama (JP); Yoichiro Mitsumoto, Tokyo (JP)

(73) Assignee: Sony Corporation (JP)

( * ) Notice: Subject to any disclaimer, the term of this patent is extended or adjusted under 35 U.S.C. 154(b) by 64 days.

(21) Appl. No.: 10/532,973

(22) PCT Filed: Nov. 13, 2003

(86) PCT No.: PCT/JP03/14456

§ 371 (c)(1),
(2), (4) Date: Apr. 28, 2005

(87) PCT Pub. No.: WO2004/049325

PCT Pub. Date: Jun. 10, 2004

(65) Prior Publication Data

US 2006/0015882 A1    Jan. 19, 2006

(30) Foreign Application Priority Data

Nov. 27, 2002  (JP) ............................. 2002-344716

(51) Int. Cl.
*G11B 17/04* (2006.01)
(52) U.S. Cl. .................................................. 720/626
(58) Field of Classification Search ..................... None
See application file for complete search history.

(56) References Cited

U.S. PATENT DOCUMENTS

| 5,974,016 | A | * | 10/1999 | Andrews et al. ............ 720/626 |
| 2001/0002187 | A1 | * | 5/2001 | Murotani ..................... 369/220 |
| 2003/0081526 | A1 | * | 5/2003 | Choi et al. .................. 369/77.2 |

FOREIGN PATENT DOCUMENTS

| JP | 01-097452 | 4/1989 |
| JP | 01-124963 | 5/1989 |
| JP | 01-170355 | 7/1989 |
| JP | 03-057767 | 3/1991 |
| JP | 05-144151 | 6/1993 |
| JP | 07-320390 | 12/1995 |
| JP | 2939970 | 6/1999 |

OTHER PUBLICATIONS

International Search Report mailed Mar. 2, 2004.

* cited by examiner

*Primary Examiner*—William Klimowicz
*Assistant Examiner*—Mark Blouin
(74) *Attorney, Agent, or Firm*—Rader, Fishman & Grauer PLLC; Ronald P. Kananen

(57) ABSTRACT

There are provided: detection sections 71, 72 for detecting an edge of discs 52, 53 so as to be laterally symmetrical about a center, at a lower edge portion inside a long sideways opening 12 of a front panel 11; and a detection section 73 for detecting a reflective foil 60 having lack portions 61, 62 put on a lower surface of a tray 13. If the disc is not in a regular mounting position in the tray 13, the disc may be prevented from falling to the inside of the drive by detecting the discs 52, 53 mounted in a misaligned state and discontinuing an operation of pulling the tray 13 in, with the combination of detection outputs from those three detection sections.

14 Claims, 20 Drawing Sheets

DISK-TYPE RECORDING AND/OR REPRODUCING APPARATUS AND METHOD OF JUDGING DISC-SHAPED RECORDING MEDIUM OF DISC-TYPE RECORDING AND/OR REPRODUCING APPARATUS

TECHNICAL FIELD

The present invention relates to a disc-type recording and/or reproducing apparatus, and a method of judging a disc-shaped recording medium of the disc-type recording and/or reproducing apparatus, and more particularly, to a disc-type recording and/or reproducing apparatus that is so configured as to mount a disc-shaped recording medium at a recording/reproducing position for a recording and/or a reproducing with a head, and a method of judging the disc-shaped recording medium of the disc-type recording and/or reproducing apparatus.

BACKGROUND ART

A disc-type recording and reproducing apparatus that is so configured as to perform a reproducing or a recording operation with an optical pickup while turning a disc-shaped recording medium is widely used. In the above apparatus, the optical pickup is made to access to an optical disc that serves as a disc-shaped recording medium by moving the optical pickup radially to the optical disc while turning the optical disc with a turntable, thereby permitting a predetermined recording or a predetermined reproducing.

In the above apparatus, the optical disc differs in laser beam wavelength of the optical pickup depending on a format of the optical disc. For instance, a laser beam having a wavelength of 780 nm is available for a case of a CD (Compact Disc). On the other hand, the laser beam having the wavelength of 650 nm is required for the case of a DVD (Digital Versatile Disc). Further, the wavelength of the laser beam available for the case of a so-called DVR (Digital Versatile Disc Rewritable) that conforms to a rewritable high-density recording format is 405 nm.

Incidentally, in Japanese Patent No. 2939970, there is disclosed a disc detection apparatus wherein, in a disc player having a sub tray serving to mount a disc available as a recording medium, a main tray serving to hold the sub tray, and a casing serving to house more than one main tray, each main tray has a through hole in a position to match a disc center hole when the sub tray with the disc mounted thereon is held at a stock position supposed to be within the casing, and also, more than one detection hole in positions to be in alignment with an axis extending in a disc loading direction through the through hole of each main tray, and also to be suited to a diameter of the disc, disc detection elements including a pair of light projection section and a light detector are disposed in positions to be in alignment with a perpendicular extending vertically through the through hole of each main tray, and also to put more than one main tray between, and further, the sub tray has a sub tray detection hole in a position to be in alignment with the axis extending in the disc loading direction through the throughhole, permitting a determination on a size and presence or absence of the disc, and further, whether or not the disc is in a predetermined mounting position, by detecting, with the light detector through the detection holes, the through hole, and the sub tray detection hole, light projected from the light projection section at the time of a transfer of the main trays from an open position supposed to be at an outside of the casing to the stock position, or the transfer of the sub tray from the stock position to a play position.

When using the optical pickup capable of emitting the laser beams of the wavelengths suited to all the different formats for the recording and the reproducing applied to the optical discs different in format, a single optical pickup provides a compatible serviceability to the above different types of optical discs.

It is supposed to be practicable that two pieces of lenses, and sections of emitting the laser beams of the wavelengths suited to the above respective for mats are mounted to the single optical pickup enough to be compatibly serviceable, in particular, to the DVR and the DVD/CD, in which case, however, a use of a mounting configuration described the above gives rise to problems that a size of the pickup is so increased as to bring about also a complicated and troublesome adjustment.

In view of the above, to solve the above problems, there is a technology of providing a DVR's optical pickup and a DVD/CD's optical pickup respectively, permitting the above problems to be eliminated by arranging these optical pickups symmetrically about a center of the turntable. In the above technology, the respective optical pickups need to be moved in a radial direction of the disc-shaped recording medium for the recording or the reproducing operation. In order to allow the optical pickups to access the optical pickups to the disc-shaped recording medium while moving the optical pickups radially to the disc-shaped recording medium as described the above, there is provided the tray having an opening that permits the optical pickups to access as described the above in the case where a feed of the disc-shaped recording medium is carried out with the tray.

However, as described the above when forming the opening for moving the optical pickups respectively radially symmetrically about the center of an optical disc mounting position of the tray, so as to access, a large opening is supposed to be given along a length direction of the tray. Thus, the disc-shaped recording medium, in particular, a bare disc is in danger of falling to a lower side of the tray through the large opening described the above. Then, the fallen disc may reach an inside of a drive to cause damages to the optical pickups etc. Even if not causing any damages to the optical pickups etc., a mistaken chucking may cause the damages to a recording surface of the bare disc when the mounted disc is misaligned.

Incidentally, the detection elements disclosed in the above Japanese Patent No. 2939970 are so disposed along a pull-in direction of the sub tray and the main tray as to be in alignment with the center of the sub tray and the main tray. Thus, the above detection elements may carry out a detection of the disc when the mounted disc is misaligned from the pull-indirection, whereas it fails to carry out any detection of the disc when the mounted disc is misaligned sideward from the center, instead of the pull-in direction.

The present invention has been undertaken in view of the above problems, and is intended to provide a disc-type recording and/or reproducing apparatus that is so configured as to, when a large opening is formed on a tray on the grounds of arranging a plurality of optical pickups having different formats so as to be in positions opposite to each other about the center of a turntable, eliminate, surely and effectively, troubles caused by the large opening of the tray, and also a method of judging a disc-shaped recording medium of the disc-type recording and/or reproducing apparatus.

DISCLOSURE OF THE INVENTION

A primary invention of the present application relates to a disc-type recording and/or reproducing apparatus that is configured so as to load a disc-shaped recording medium at a recording/reproducing position, and to perform a recording and/or a reproducing with a head, characterized by:

including a pair of detection means so as to be positioned at both sides of a moving path of a center of the disc-shaped recording medium, on a moving path for loading the disc-shaped recording medium; and permitting the detection means to detect presence or absence of the mounted disc-shaped recording medium, and whether or not the center of the disc-shaped recording medium is misaligned to a lateral direction from the moving path.

In the above disc-type recording and/or reproducing apparatus, preferably, the pair of detection means is arranged symmetrically about the moving path of the center of the disc-shaped recording medium. It is also preferable that the detection means have a light emitter and a light detector, and carry out a detection operation in which a light emitted from the light emitter is reflected by the disc-shaped recording medium and received with the light detector.

Another primary invention of the present application relates to a disc-type recording and/or reproducing apparatus that is configured so as to load a disc-shaped recording medium at a recording/reproducing position by pulling a tray on which the disc-shaped recording medium is mounted, and to perform a recording and/or a reproducing with a head, characterized by including:

tray detection means for detecting a predetermined portion of the tray, and disc detection means for detecting the disc-shaped recording medium on a pull-in path of the tray.

In the above disc-type recording and/or reproducing apparatus, preferably, the tray detection means has a target section of detection which is provided, along the pull-in direction of the tray, at a predetermined position and the disc detection means directly detects the disc-shaped recording medium, a combination of the detection by means of the disc detection means and the detection by means of the tray detection means allows to detect whether or not the disc-shaped recording medium is properly mounted on the tray, or a size of the disc-shaped recording medium. It is also preferable that the tray detection means and the disc detection means are provided on a peripheral edge of an opening serving to pull the tray in, at a front panel. It is also preferable that the tray detection means has, in addition to the light emitter and the light detector, a target section of detection including a reflective or a non-reflective portion at the tray side, and carries out the detection operation by detecting whether or not the light emitted from the light emitter is reflected by the target section of detection. It is also preferable that the disc detection means has the light emitter and the light detector, permitting the light detector to carry out a detection operation by allowing the light emitted from the light emitter to be reflected from the disc-shaped recording medium.

Preferably, the tray has a reflective foil attached along the pull-in direction of the tray on a back surface opposite to a mounting surface for mounting the disc-shaped recording medium; a lack portion where the reflective foil is absent corresponding to the size of the disc-shaped recording medium; and it is judged such that the disc-shaped recording medium is properly mounted if the tray detection means detects the lack portion and if the disc detection means detects the disc-shaped recording medium; while in cases other than the above, it is judged such that the disc-shaped recording medium is not properly mounted.

Preferably, the disc detection means are provided in a pair to be positioned at both sides of the moving path of the center of the disc-shaped recording medium, a reflective foil is attached along the pull-in direction of the tray on a back surface opposite to the tray's mounting surface for mounting the disc-shaped recording medium; a lack portion where the reflective foil is absent corresponding to the size of the disc-shaped recording medium; and it is judged such that the disc-shaped recording medium is properly mounted if the tray detection means detects the lack portion and if the disc detection means detects the disc-shaped recording medium; while in cases other than the above, it is judged such that the disc-shaped recording medium is not properly mounted.

A primary invention relating to a judging method relates to a method of judging a disc-shaped recording medium in a disc-type recording and/or reproducing apparatus characterized wherein the apparatus is configured to load the disc-shaped recording medium at a recording/reproducing position by pulling the tray on which the disc-shaped recording medium is mounted and to perform a recording and/or a reproducing with a head, the apparatus including:

tray detection means for detecting a target section of detection provided at a predetermined position of the tray; and disc detection means for detecting the disc-shaped recording medium on the tray, on a peripheral edge of the opening, for pulling the tray in, on a front panel, wherein it is judged a size of the disc-shaped recording medium, or whether or not the disc-shaped recording medium is properly mounted, depending on a combination of a detection output from the tray detection section and a detection output from the disc detection section at the time when the tray is pulled in.

In a disc player suited to the recording and the reproducing of various types of optical discs such as the CD requiring a 405 nm-Blu-ray laser beam, and a 780 nm-laser beam, and the DVD requiring a 650 nm-laser beam, it is difficult to meet all the above formats with the single optical pickup, so that there are provided two types of optical pickups different in format from each other, in which case, these optical pickups are mounted at the opposite sides supposed to be mutually symmetrical about the turntable or a spindle motor. Then, there is provided a large opening enough to be suited to the above two types of optical pickups, at the center of the tray. Further, there are also provided, on the tray, guides or grooves for mounting directly bare discs respectively having diameters of 12 cm and 8 cm, in addition to a cartridge containing the optical disc requiring the Blu-ray laser beam.

Thus, a mounting of the disc-shaped recording medium or the bare disc in a condition where in particular the bare disc is protruding from the above guides or grooves, because of no proper matching of the bare disc with the above guides or grooves, brings about no proper chucking of the bare disc, in which case, the mistaken chucking may cause the damages to the recording surface of the bare disc. Further, the 8 cm-diameter disc smaller than the other, when falling, through the above large opening of the tray, to an inside of the drive supposed to be at the lower side of the tray, may cause the damages to the optical pickups etc.

In view of the above, a preferable mode of the invention involved in the present application provides three types of optical detection apparatuses and the reflective portion put on the lower surface of the tray for the judgment of the position of the bare disc. Specifically the detection sections available in a pair are in positions supposed to be laterally symmetrical about a widthwise center of the tray, permitting the detection of a timing of a passage of the bare disc through respective sensors. On the other hand, the remaining detection section detects the position of the tray based on the detection of the reflective portion put on the tray. Then, a relative position of the tray to the bare disc is judged depending on the combination of the detection outputs from these detection sections, and when there is given the judgment that the bare disc is not in a regular mounting position, an operation of pulling the tray in, in other words, a loading operation is discontinued at a point of time when the above judgment is given, preventing the bare disc, particularly, the 8 cm-diameter bare disc from falling to the inside of the drive. Thus, according to the above preferable mode, the problems particularly caused by the opening formed on the tray lengthwise in the pull-in direction may be eliminated.

BRIEF DESCRIPTION OF THE DRAWINGS

FIG. 18 is a relevant perspective view of a state where an 8 cm-diameter bare disc is put on.

BEST MODE FOR CARRYING OUT THE INVENTION (1) Description of Configuration

Figure 1:
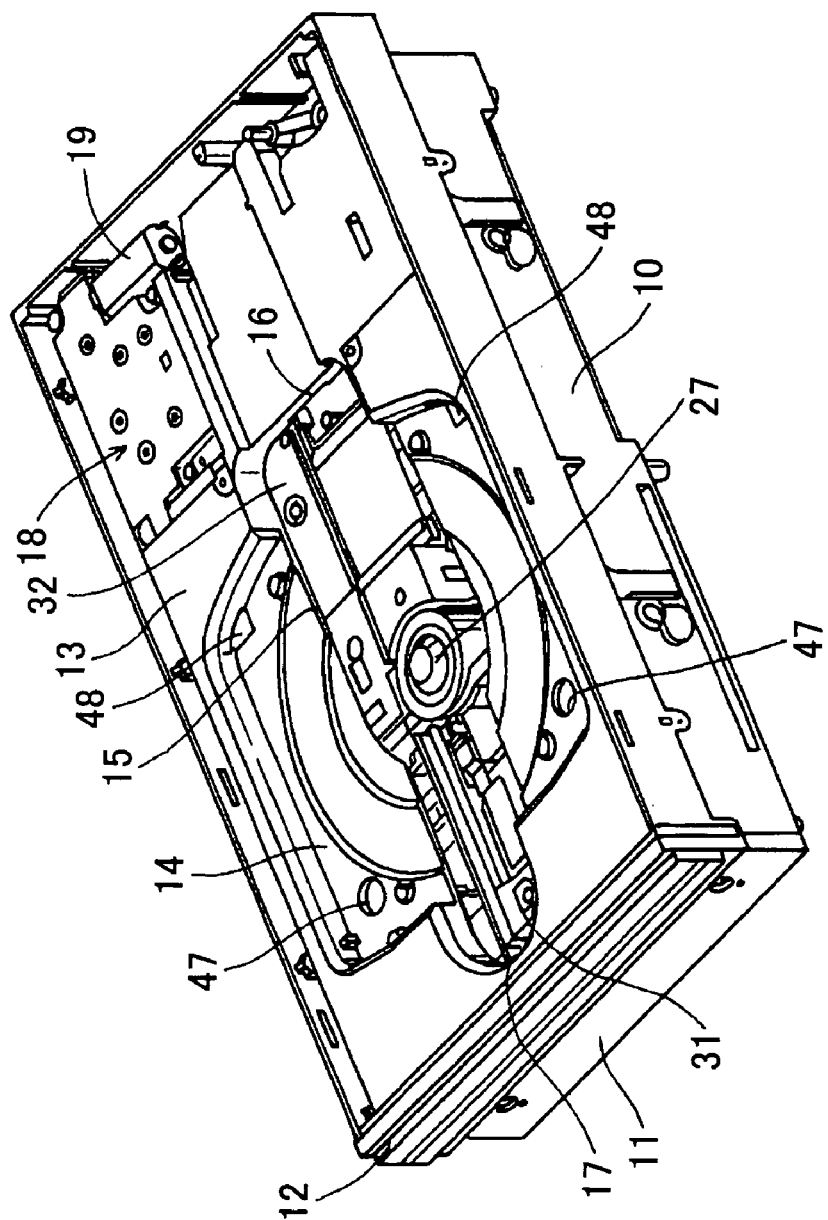
FIG. 1 is a relevant perspective view of a disc type recording and/or reproducing apparatus.
Figure 2:
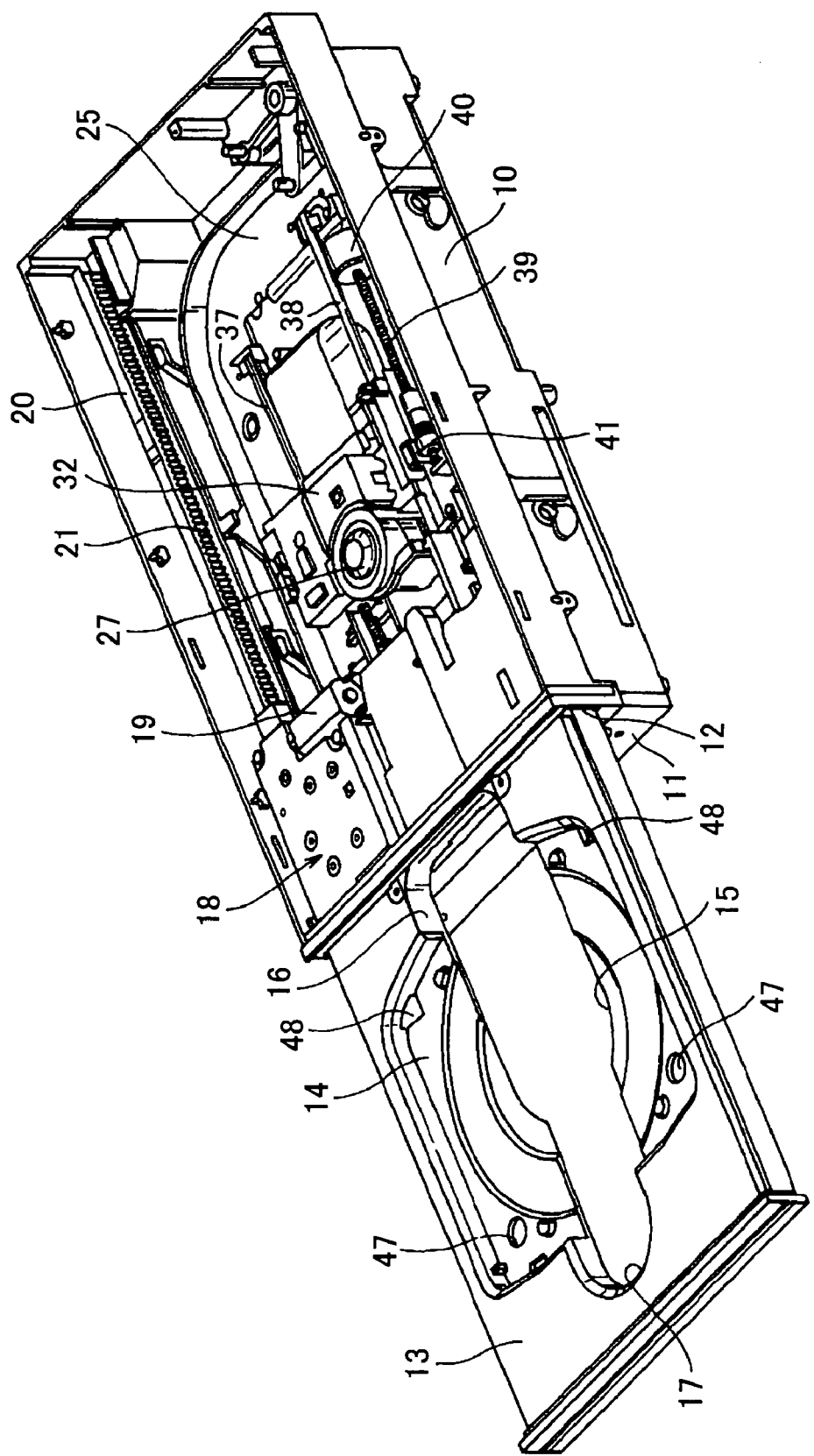
FIG. 2 is a perspective view of a state where a tray of a disk type recording and/or reproducing apparatus is pulled.
Figure 3:
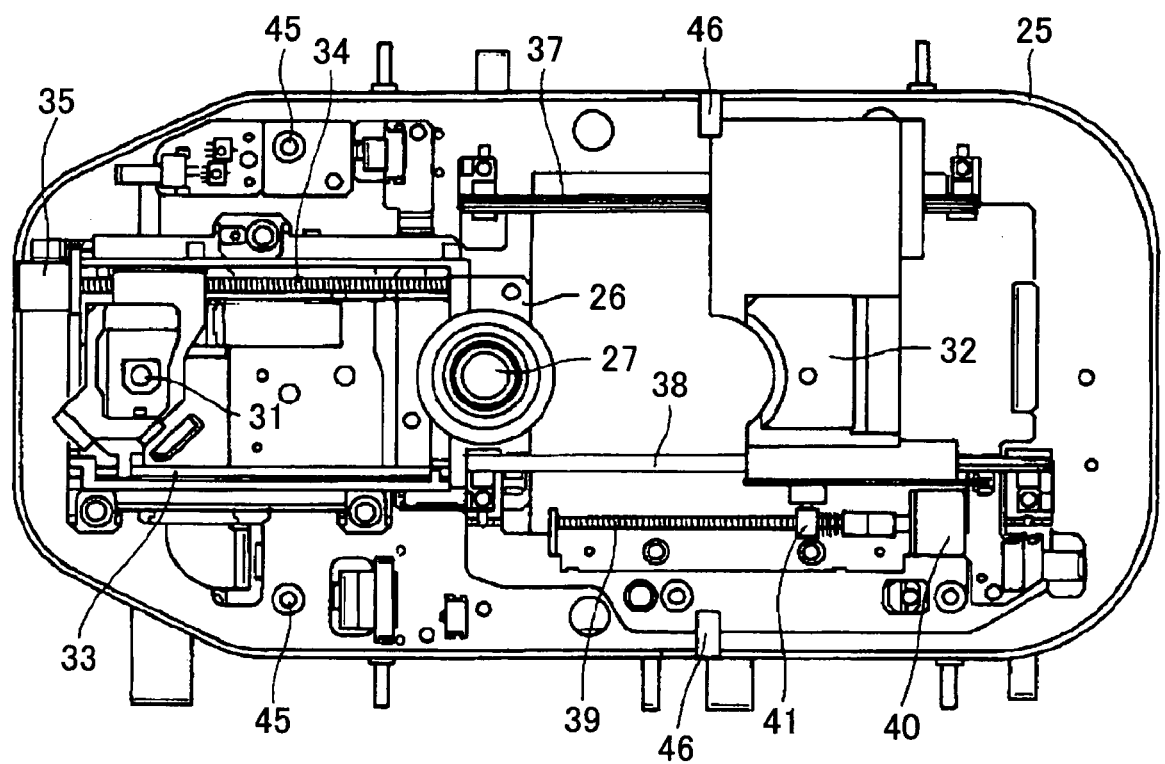
FIG. 3 is a plan view of a base unit.
Figure 4:
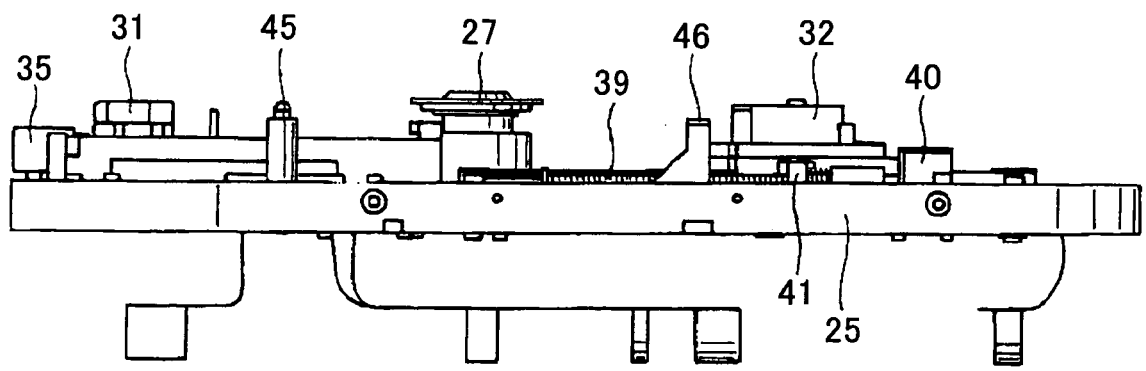
FIG. 4 is a side view of a base unit.
Figure 5:
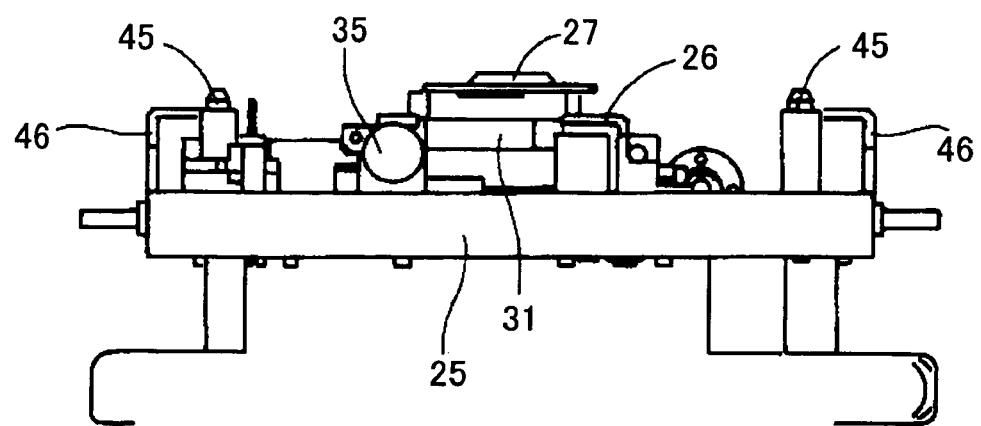
FIG. 5 is a front view of a base unit.
Figure 6:
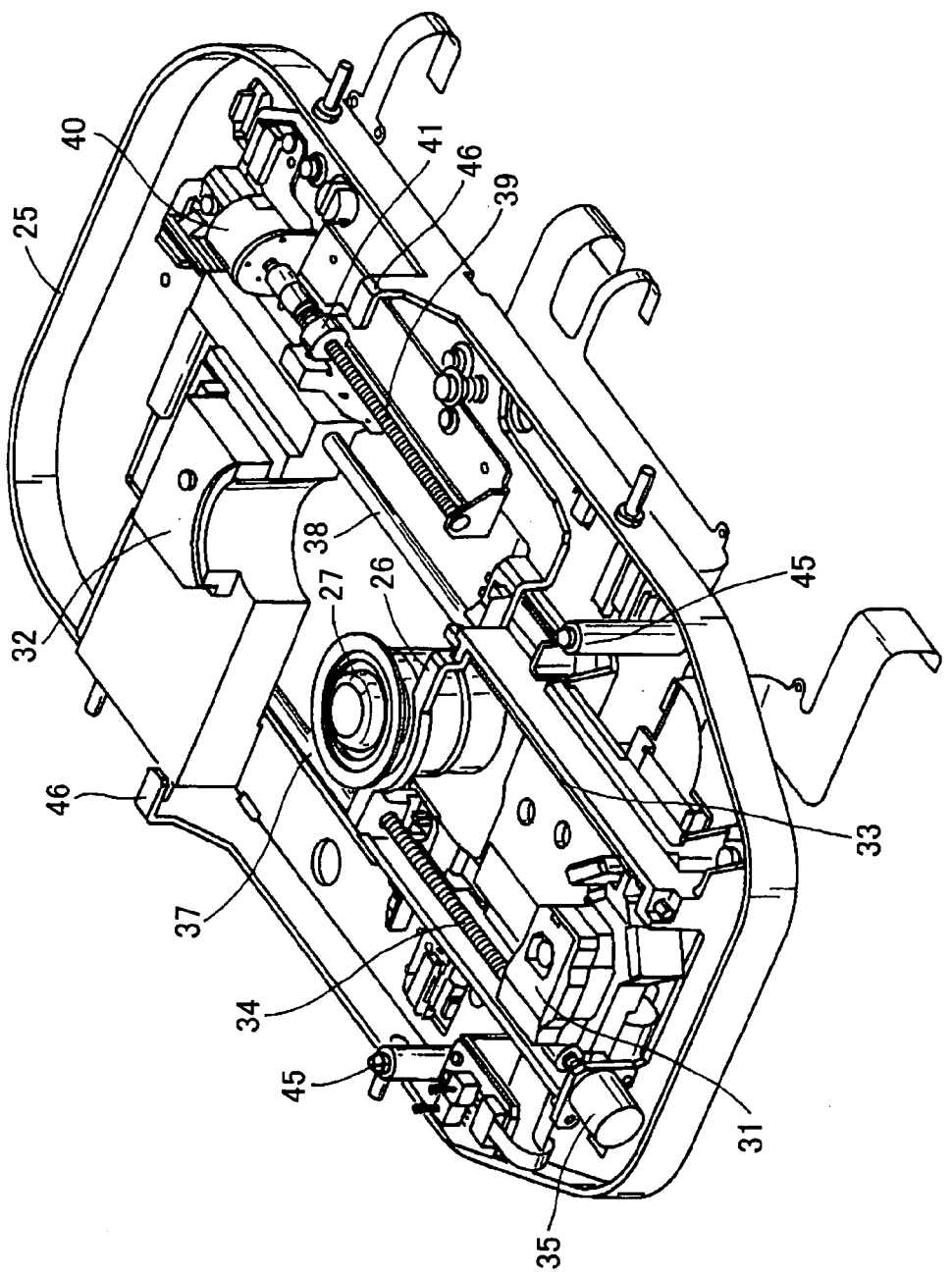
FIG. 6 is a perspective view of a base unit.

FIGS. 1 and 2 illustrate an overall configuration of a disc-type recording and reproducing apparatus according to an embodiment of the present invention, wherein this apparatus has a flatly rectangular parallelepiped-shaped outer casing 10. Incidentally, in FIGS. 1 and 2, there is shown the outer casing with an upper part opened. Then, a front panel 11 serving to cover a front surface-side opening of the outer casing 10 has a long sideways opening 12, permitting a tray 13 to be loaded into the outer casing 10 and be able to be drawn out through the long sideways opening 12.

The tray 13 has a recess section 14 serving to accept a cartridge or a bare disc approximately in the center portion, and also, includes an opening 15 so extending longitudinally as to cross the recess section 14. The opening 15 has, at an inner side, a U-shaped cutout 16 contiguously, and at this side, a semicircular cutout 17.

There is also provided a drive section 18 on the tray 13, more specifically, on one side portion at an inner side of the tray, and further, a motor 19 for driving the drive section 18 is mounted to the drive section. The tray 13 is supported in a slidable manner with step portions 20 located at the inside of the outer casing 10, more specifically, at the opposite sides of the inside of the outer casing, in which case, a pinion contained in an output end of the drive section 18 meshes with a rack 21 located at a lower side of one step portion 20, thereby permitting the tray to travel by oneself in such a manner as to be freely drawn out and housed through the long sideways opening 12 as shown in FIGS. 1 and 2.

The outer casing 10 has a bottom plate having, at an upper portion, a base unit 25 as shown in FIGS. 3 to 6. The base section is formed with a chassis made of sheet metal, and has, at an approximately center portion through a bracket 26, a turntable 27 contained in a turning drive section. The turntable 27 is supposed to be driven directly with a motor located at a lower side of the turntable.

The base unit 25 also has a DVD's pickup 31 disposed at a front portion more than the turntable 27, and also a DVR's pickup 32 disposed at an inner side. In the base section, the DVD's pickup 31 is supported through the opposite sides thereof with a guide rod 33 and a feed screw 34, in which case, the feed screw 34 is driven rotationally with a stepping motor 35, thereby permitting the DVD's pickup to be moved in a radial direction of an optical disc.

Conversely, the DVR's pickup 32 located at the inner side is supposed to be guided with a pair of opposite guide rods 37 and 38, and besides, has a feed screw 39 serving to move the DVR's pickup 32 to the optical disc in the radial direction of the optical disc. The feed screw 39 is supposed to be driven with a stepping motor 40. Further, the feed screw 39 is in screwed engagement with a nut 41 of the pickup 32.

There are also provided, on the base unit 25, a pair of support rods 45 standing upright at the front opposite sides of the base section, and a support arm 46 formed contiguously as an integral part of each of the rear opposite sides of the base section. As the base unit 25 is moved upwards with a lift mechanism, the support rods 45 and the support arms 46 come to project from openings 47 and 48 of the tray 13, thereby permitting a DVR's cartridge 51 mounted on the tray 13 to be supported through four corner portions of the cartridge from a lower surface of the cartridge.

Figure 13:
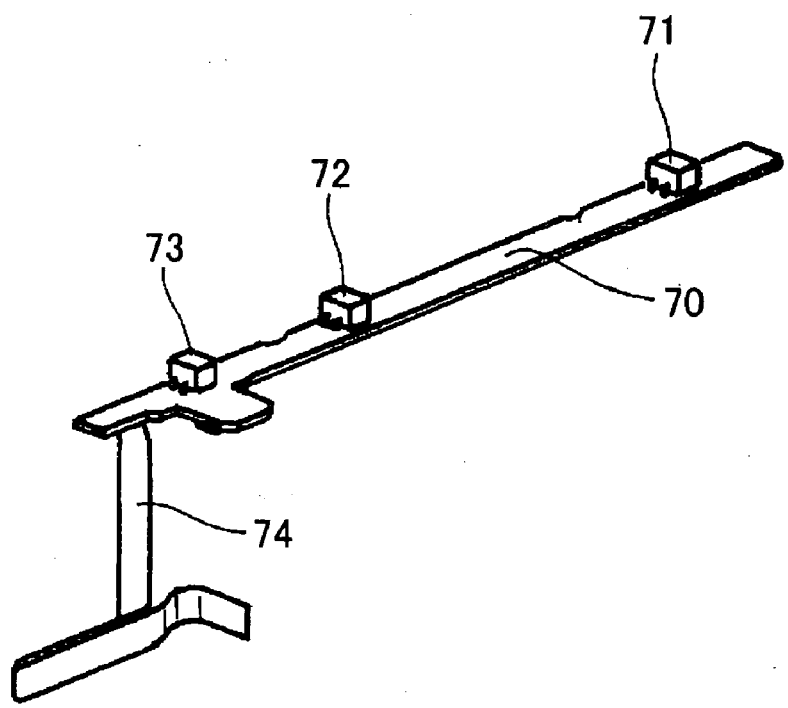
FIG. 13 is a relevant perspective view showing a fitting state of detector of an optical disc.
Figure 14:
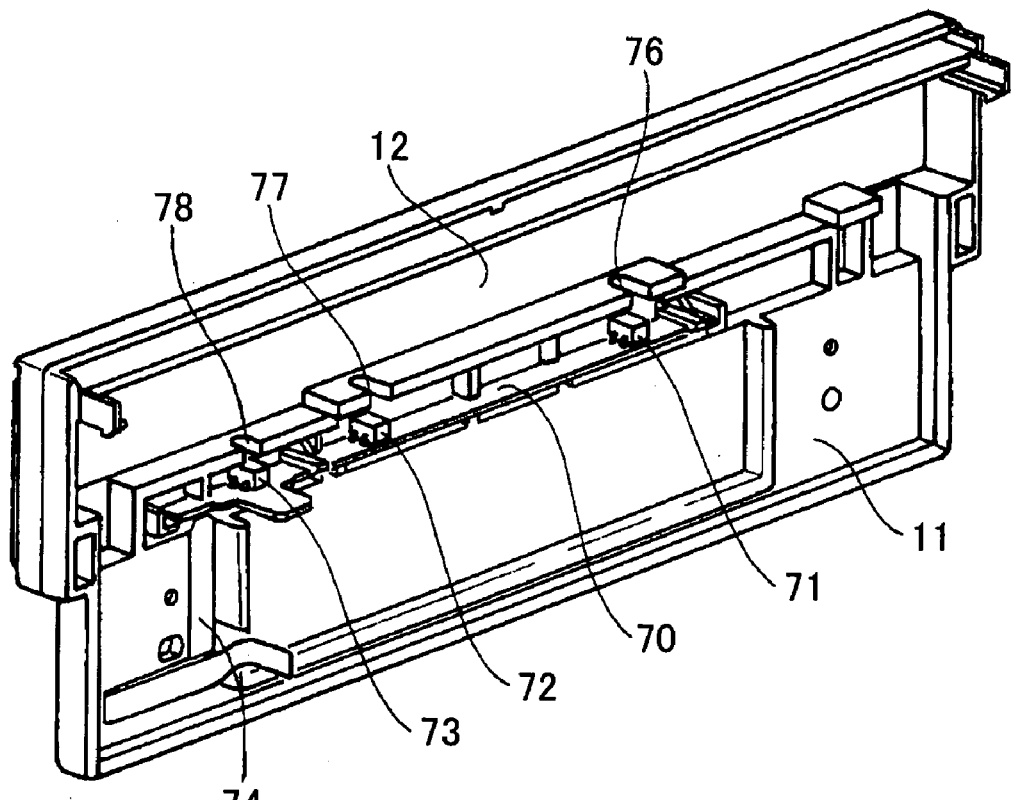
FIG. 14 is a relevant perspective view of a back of a front panel on which a detector is mounted.
Figure 15:
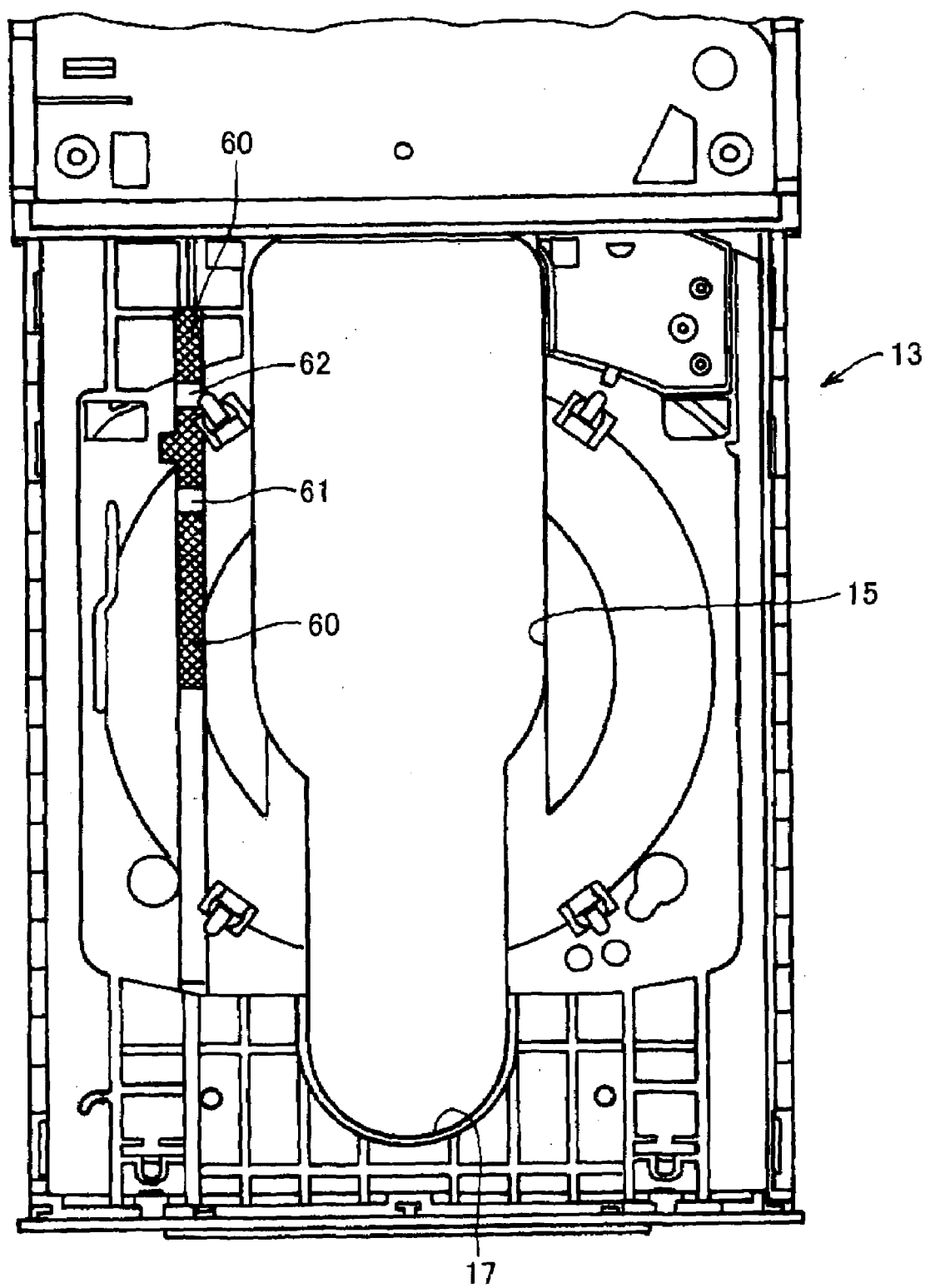
FIG. 15 is a bottom plan view of a tray.
Figure 23:
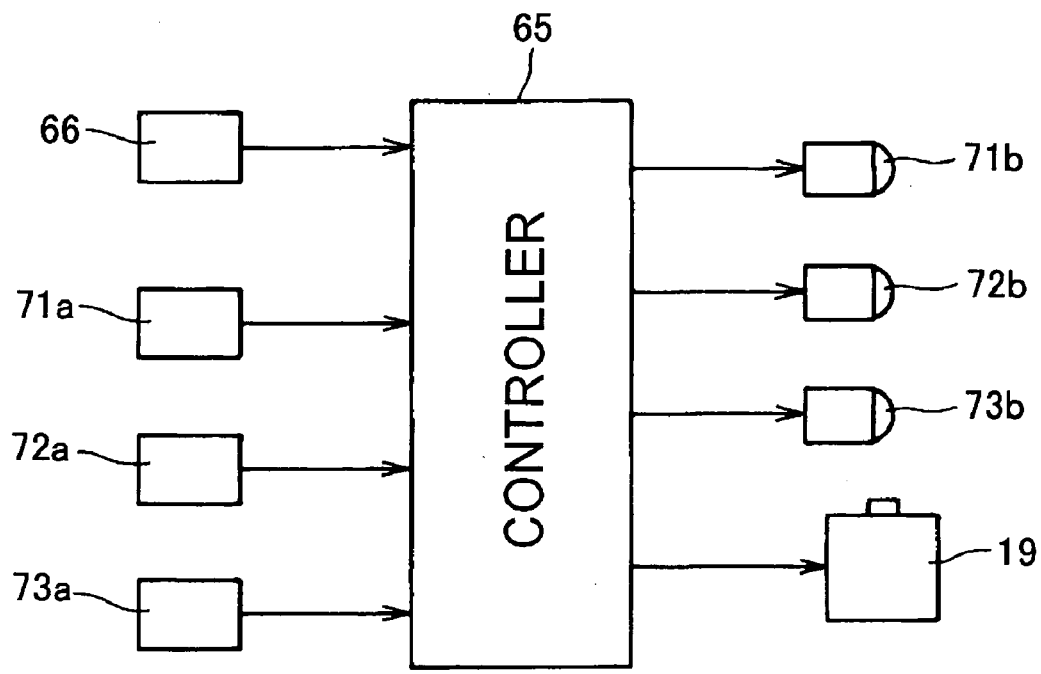
FIG. 23 is a block diagram showing a configuration of a system.

A configuration serving to detect a disc-shaped recording medium, in particular, the bare disc in the above disc-type reproducing apparatus is now described. A printed circuit board 70 as shown in FIGS. 13 and 14 is mounted to an inside of the front panel 11 mounted to the front surface side of the outer casing 10 in the embodiment as shown in FIG. 13. The printed circuit board 70 has a detection section 71 serving to detect a left side of the disc, a detection section 72 serving to detect a right side of the disc, and a detection section 73 serving to detect the tray 13. Incidentally, these detection sections 71, 72, and 73 are respectively including light detection elements 71a, 72a, and 73a, and light emission elements 71b, 72b, and 73b as shown in FIG. 23. Then, these detection sections 71 are configured to be fed through a flexible substrate 74 as shown in FIG. 13, and also, to obtain detection signals.

As shown in FIG. 14, the printed circuit board 70 having the above detection sections 71 to 73 is disposed at the inside of the front panel 11, more specifically, at the inside of a lower edge of the long sideways opening 12. Then, the front panel 11 has, at a peripheral edge portion located at a lower side of the long sideways opening 12, laterally U-shaped cutouts 76, 77, and 78 enough to be effective in carrying out the above detection with the detection sections 71, 72, and 73, permitting the detection operation with the detection sections 71 to 73 through the cutouts 76 to 78.

The above detection sections 71 and 72 are both supposed to directly detect bare discs 52 and 53, in which case, the detection of the light emitted from the light emission elements 71b and 72b of these detection sections is carried out with the light detection elements 71a and 72a by the reflection of the light from surfaces of the bare discs 52 and 53. Conversely, the tray 13 produces no effect of reflecting the light by itself, and thus, has, on the lower surface, a reflective foil 60 put in the pull-in direction of the tray 13, more specifically, in the direction that the opening 15 extends. The reflective foil 60 has a pair of lack portions 61 and 62. The lack portion 61 is so formed as to be operative in linkage with the detection of the edge of the bare disc 53 having a diameter of 8 cm. Conversely, the lack portion 62 is so arranged as to be operative substantially in linkage with the detection of the edge of the bare disc 52 having a diameter of 12 cm.

Figure 17:
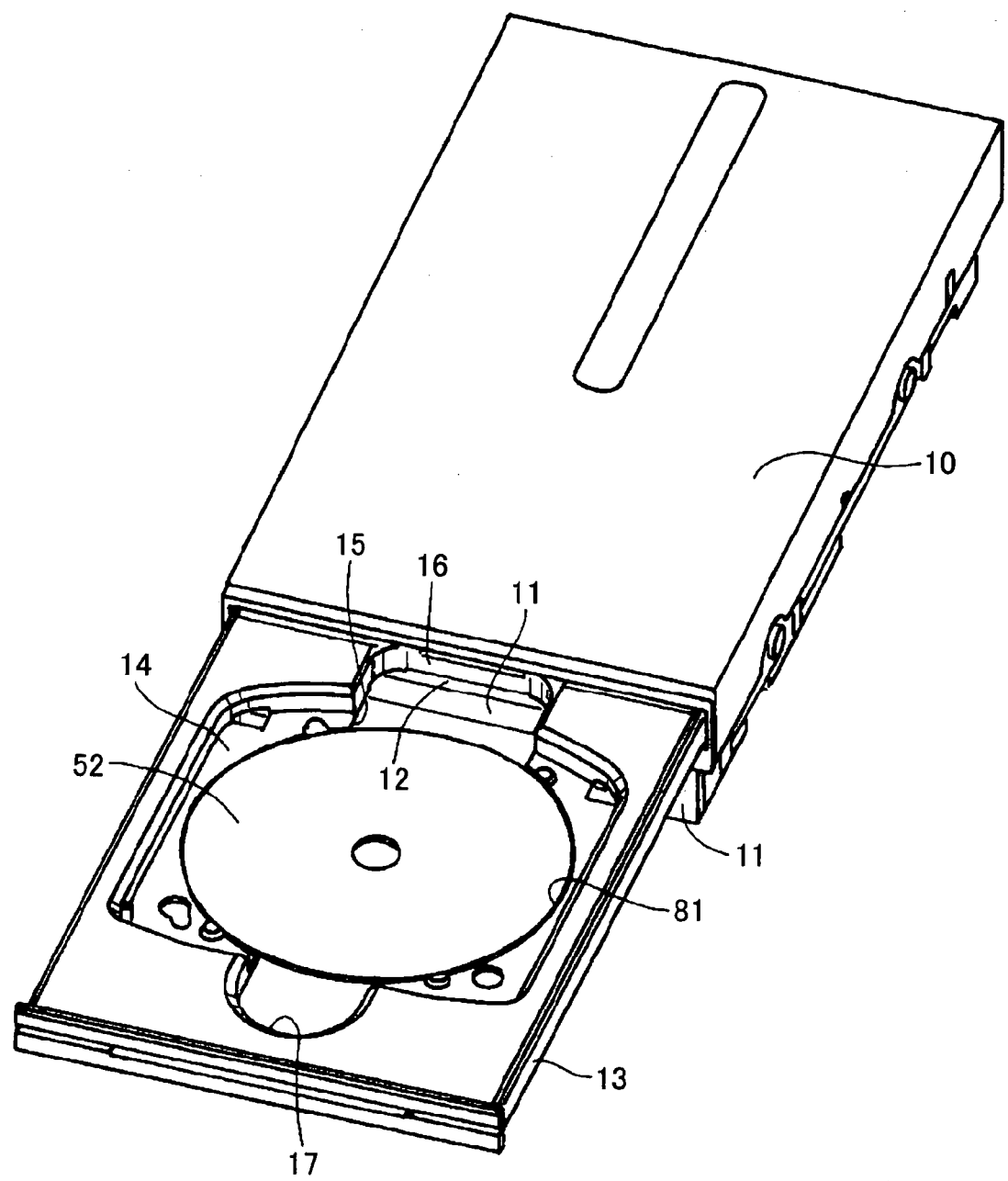
FIG. 17 is a relevant perspective view of a state where a 12 cm-diameter bare disc is mounted.
Figure 18:
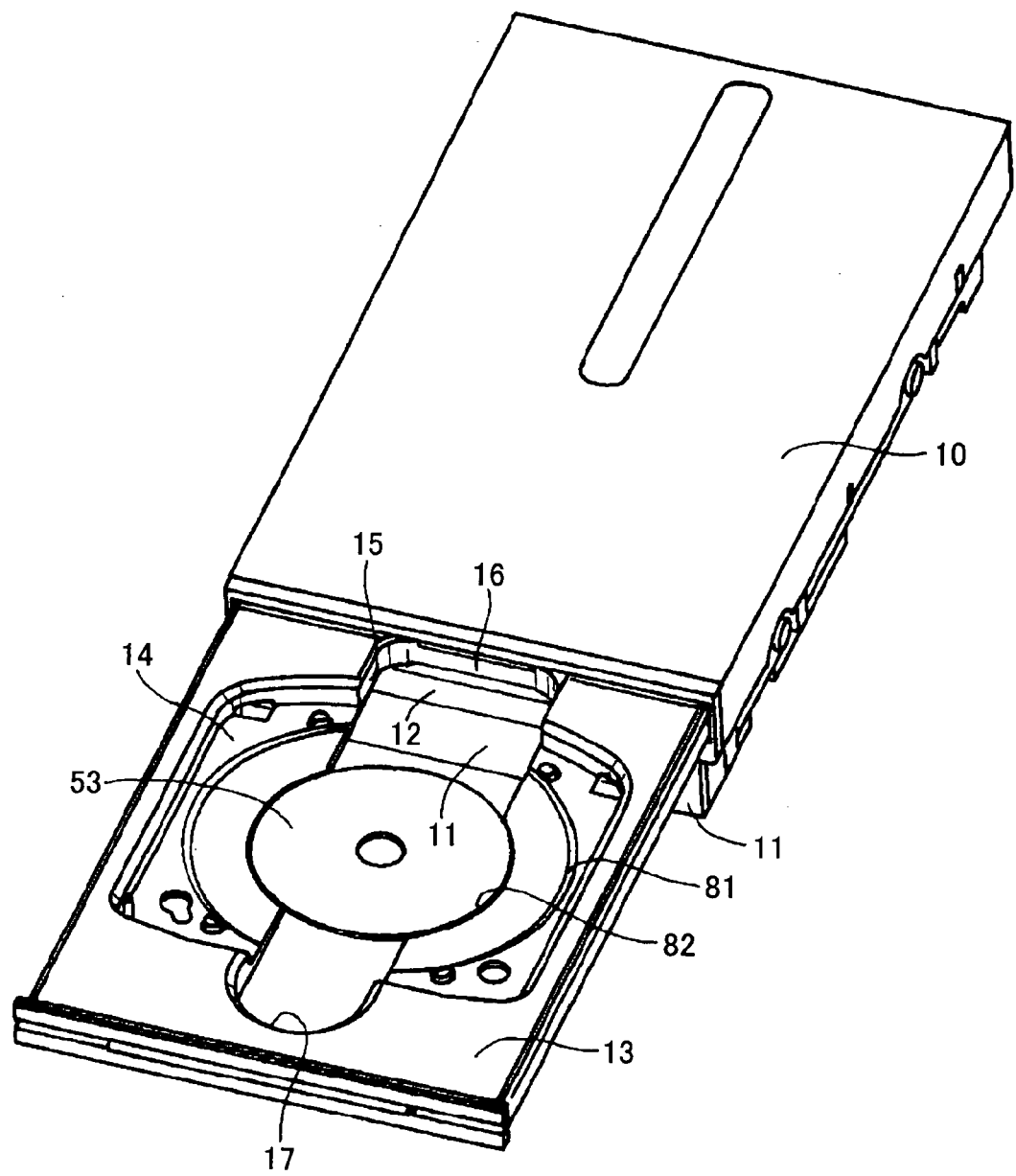

As shown in FIG. 17, the tray 13 has, on the upper surface, the recess section 14 serving to house the DVR's cartridge 51 as described the above, and the recess section 14 further has therein a recess section 81 serving to house the 12 cm-diameter bare disc 52, and furthermore, in the recess section 81, a concentric recess section 82 serving to accept the 8 cm-diameter bare disc 53. FIG. 17 shows the tray with the 12 cm-diameter bare disc 52 housed in the recess section 81, while FIG. 18 shows the tray with the 8 cm-diameter bare disc 53 housed in the recess section 82.

A system configuration is now described with reference to FIG. 23. A switch 66 serving to detect the DVR's cartridge 51, and the light detection elements 71a, 72a, and 73a of the detection sections 71, 72, and 73 are respectively connected to an input side of a controller 65 serving to perform a control operation. Conversely, the light emission elements 71b, 72b, and 73b of the detection sections 71, 72, and 73 are respectively connected to an output side of the controller 65. Further, the controller 65 is connected so as to perform the control of the motor 19 for pulling-in the tray 13.

(2) Description of Operation

Figure 7:
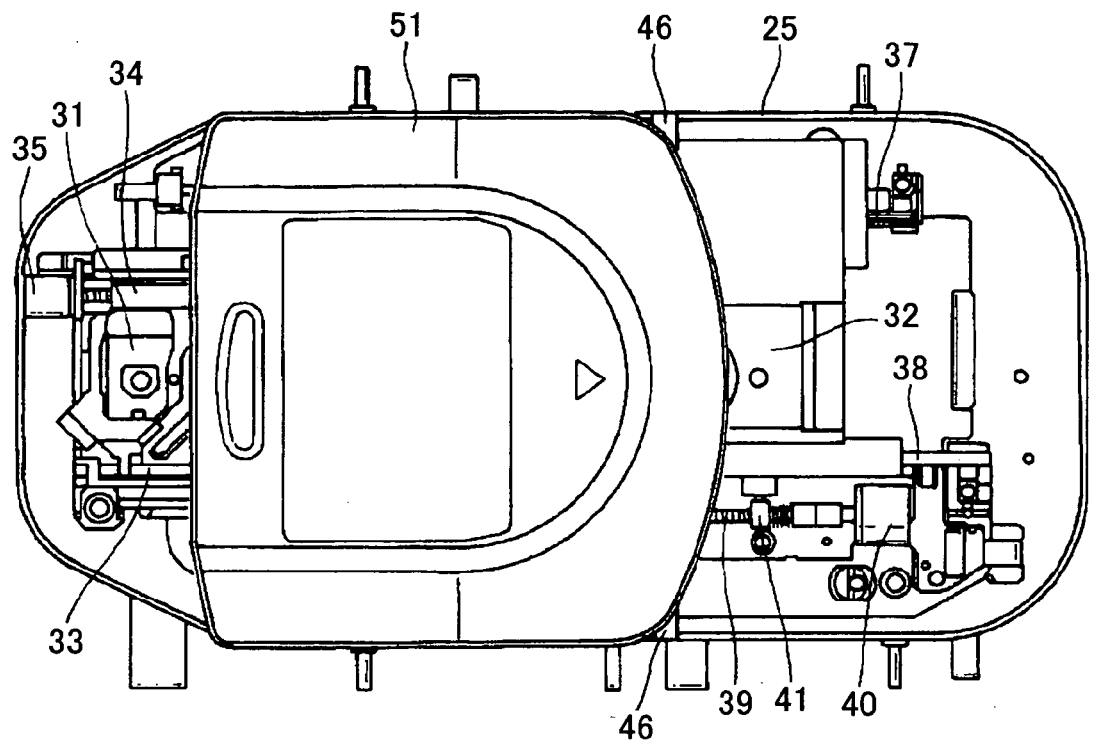
FIG. 7 is a plan view of a base unit on which a cartridge for DVR is mounted.
Figure 8:
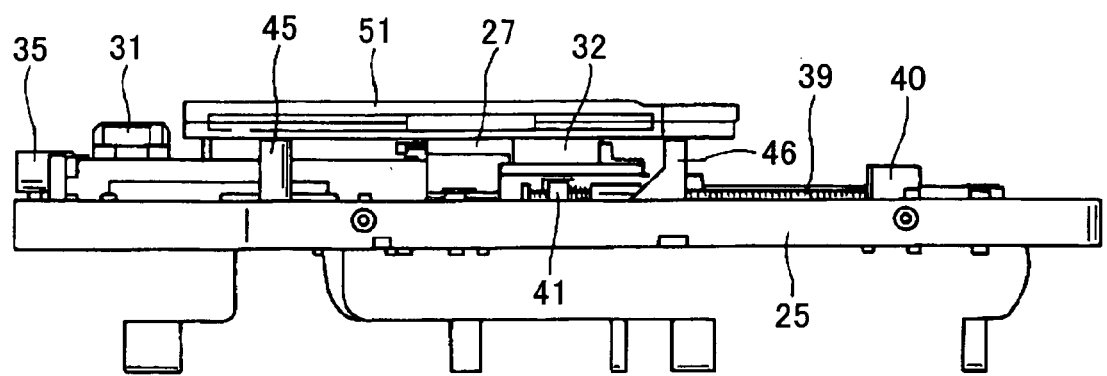
FIG. 8 is a side view of a base unit on which a cartridge for DVR is mounted.
Figure 9:
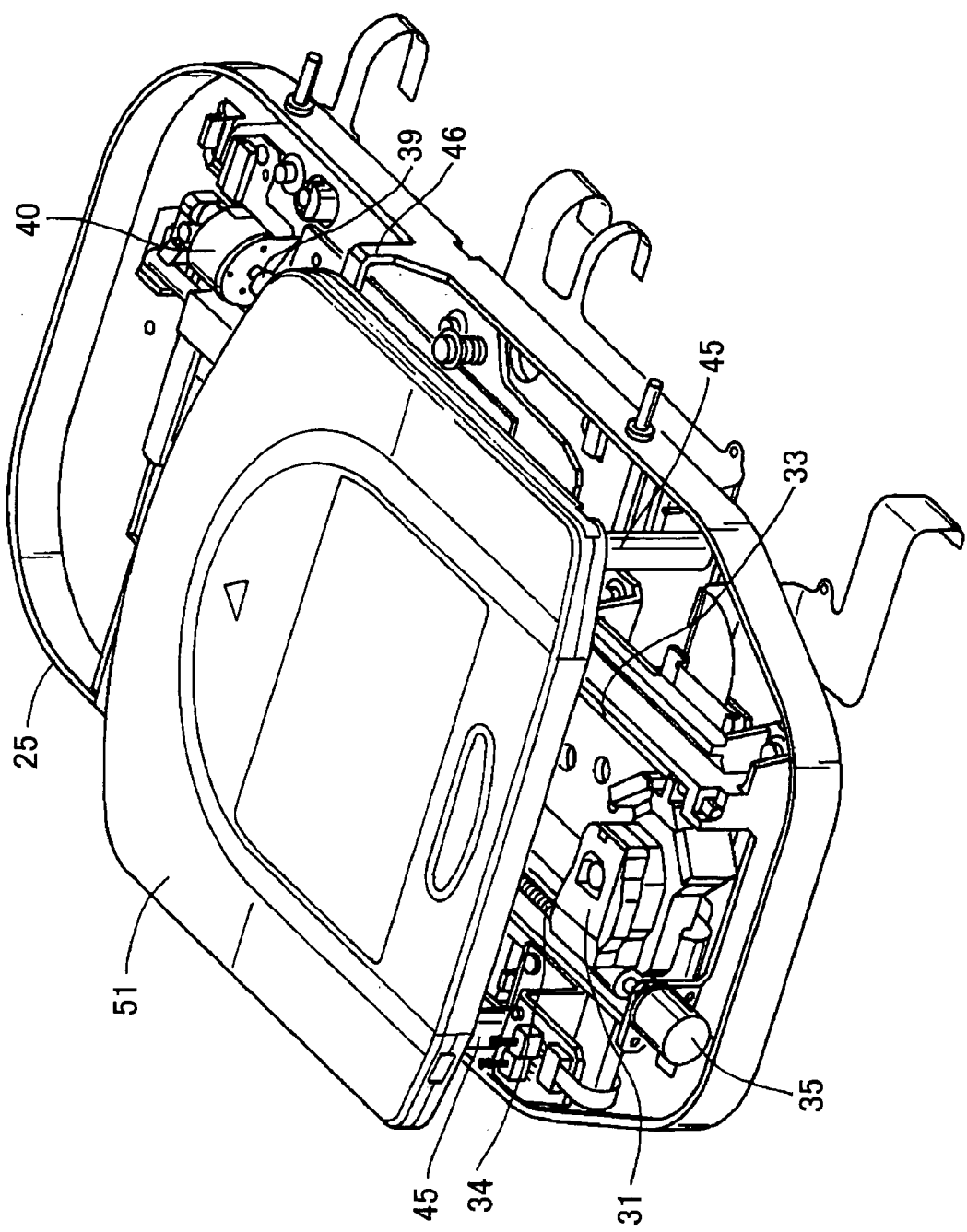
FIG. 9 is a perspective view of a base unit on which a cartridge for DVR is mounted.

An operation of the recording and reproducing apparatus according to the above configuration is now described. A pulling of the tray 13 into the outer casing 10, when carried our with the DVR's cartridge 51 mounted in the recess section 14 of the tray 13 shown in FIG. 2, permits the DVR's cartridge 51 to be mounted in the apparatus as shown in FIGS. 7 to 9. At the time of the above mounting, the stepping motor 35 and the feed screw 34 cause the DVD's pickup 31 to be moved to a portion supposed to be at an outer side of the DVR's cartridge 51, more specifically, at the front side of the tray 13. Then, at the time, the DVR's cartridge 51 is supported with the pair of support rods 45 and the pair of support arms 46 on the base unit 25 respectively. The support rods 45 and the support arms 46 all come to face on the recess section 14 of the tray 13 through the openings 47 and 48 of the tray 13 by a lifting operation of the base unit 25, permitting the DVR's cartridge 51 to be located properly.

Figure 10:
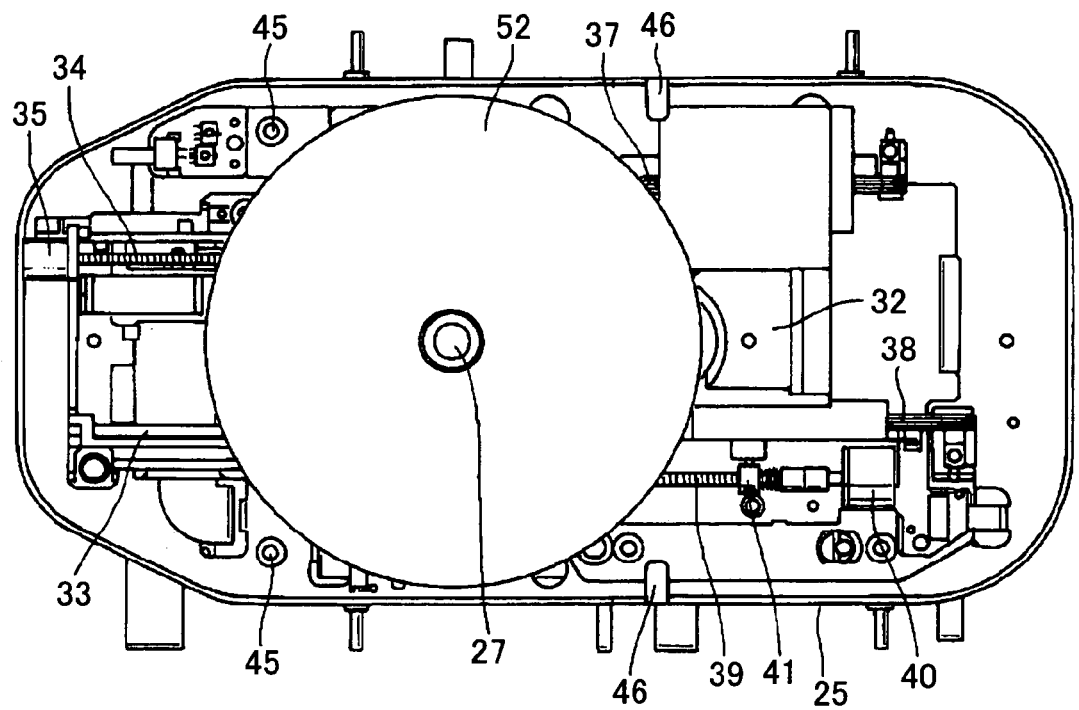
FIG. 10 is a plane view of a base unit on which a bare disc is mounted.
Figure 11:
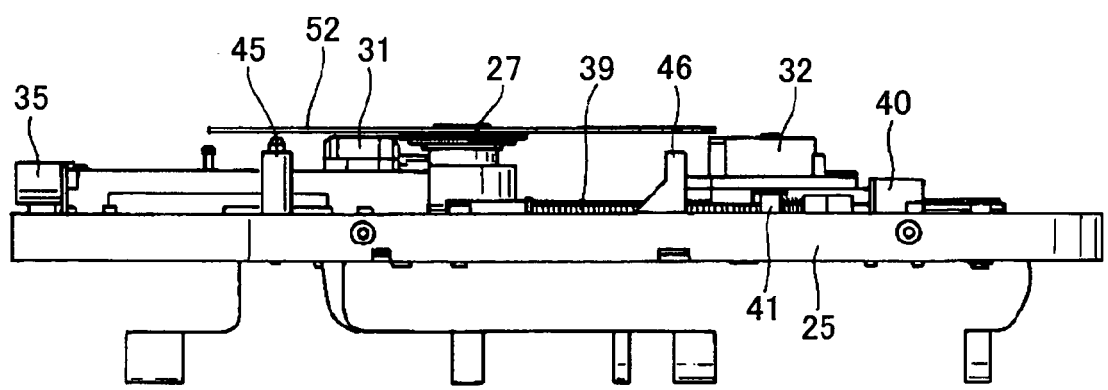
FIG. 11 is a side view of a base unit on which a bare disc is mounted.
Figure 12:
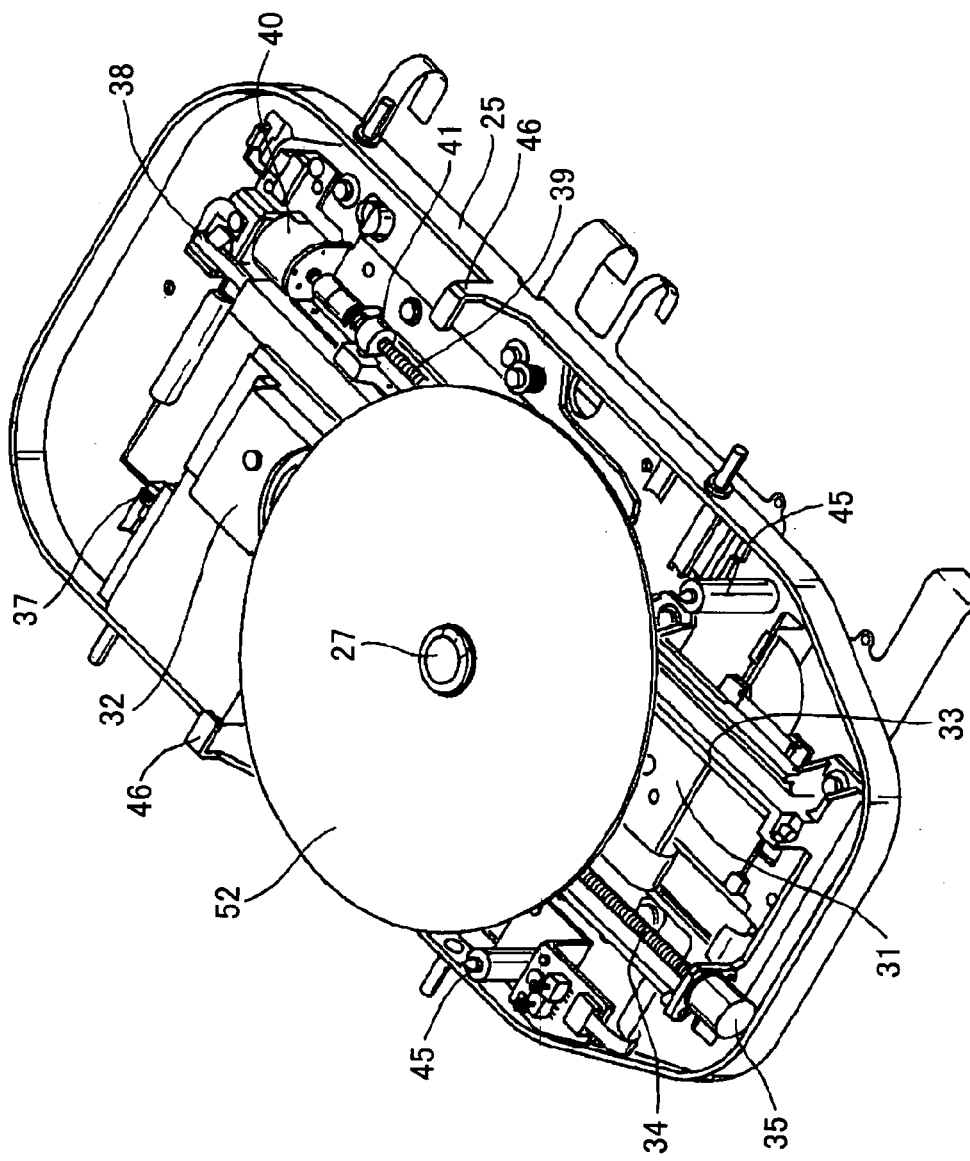
FIG. 12 is a perspective view of a base unit based on bare disc is mounted.

Conversely, the pulling of the tray 13 in with the bare disc 52 mounted in the recess section 14 of the tray 13 permits the tray 13 to be pulled into the outer casing 10. A positional relation of the bare disc 52 on the base unit 25 at this time is supposed to be as shown in FIGS. 10 and 12. In other words, in the case of the above positional relation, the stepping motor 40 causes the feed screw 39 to move the DVR's pickup 32 to a portion supposed to be at the inner side of the tray 13. In other words, the DVR's pickup 32 is located at an outer side of the bare disc 52. In other words, there is provided a mechanism where the DVR's pickup 32 is moved so as to prevent at least a lens portion of the DVR's optical pickup from reaching the inside of a projection area of the bare disc 52. Then, the stepping motor 35 causes the DVD's pickup 31 to be moved to the lower surface of the bare disc 52 through the feed screw 34. In the condition described the above, the bare disc 52 is driven rotationally with the turntable 27, providing the recording and/or the reproducing for the bare disc 52.

As described the above, the recording and reproducing apparatus of the above embodiment of the present invention is a recording and reproducing apparatus that is able to use two types of disc-shaped recording mediums having mutually incompatible formats such as the DVD/CD and the DVR. In this recording and reproducing apparatus, the base unit 25 is formed with the sheet metal or a resin, and is provided within the outer casing 10 of the above apparatus. Then, the base unit 25 is configured to have, thereon, the DVD/CD's pickup 31 arranged at this side or the front side, and also, the DVR's pickup 32 arranged at the inner side. Conversely, a single motor is employed as an optical disc turning motor in common to both pickups as with the turntable 27, permitting the above two types of pickups 31 and 32 to be moved freely in the radial direction of the optical disc about the center of the turntable 27 respectively in positions that are 180° apart in a circumference direction of the turntable 27. Incidentally, the two types of pickups 31 and 32 are made tiltable and position-adjustable independently.

Figure 16:
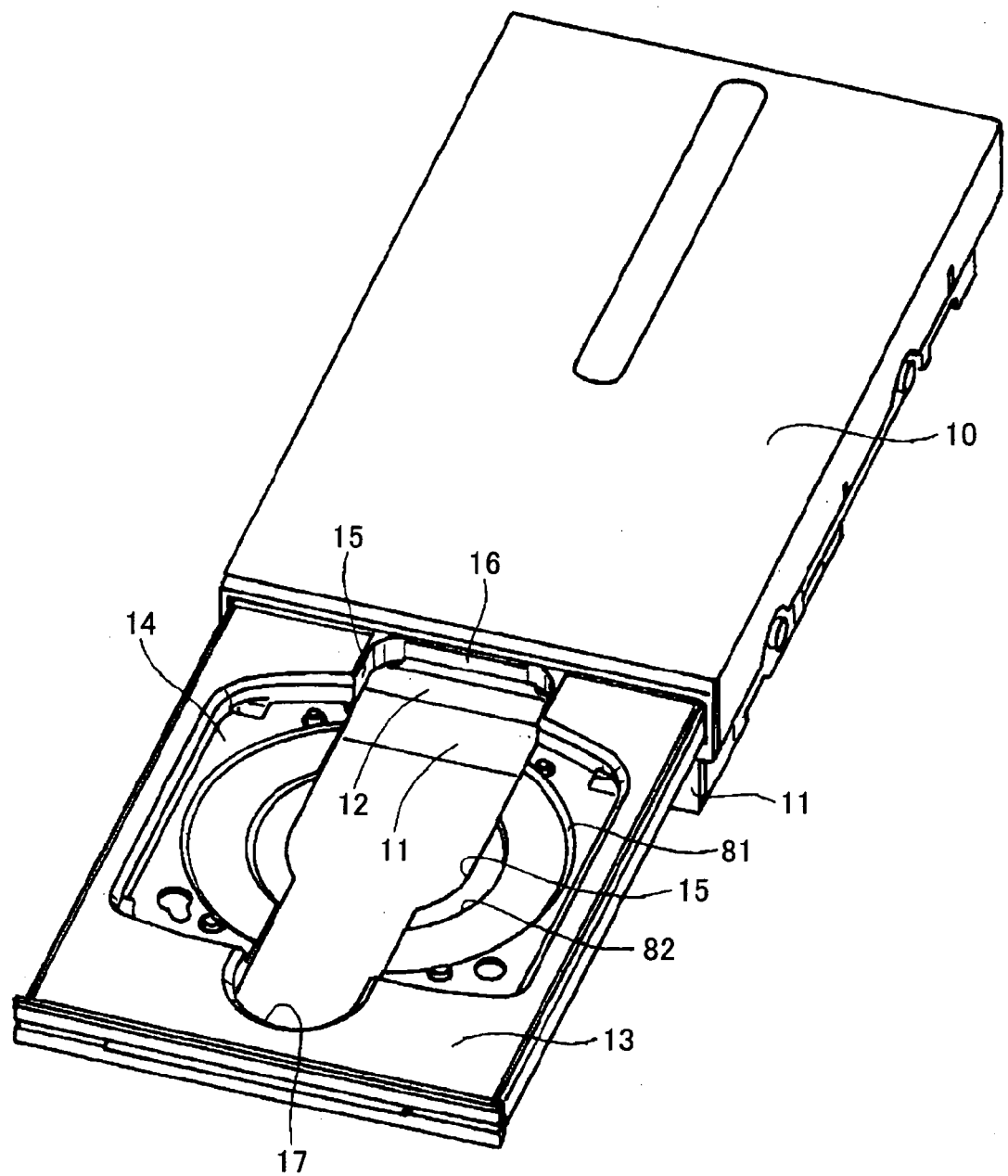
FIG. 16 is a relevant perspective view of a state where a tray is pulled.

The operation of detecting the bare discs 52 and 53 with the detection sections 71, 72, and 73 provided on the front panel 11 of the outer casing 10 of the recording and reproducing apparatus is now described. As shown in FIG. 16, there are provided, on the tray 13, the recess section 14 serving to house the DVR's cartridge 51, and further, in the recess section 14, the recess section 81 serving to house the 12 cm-diameter bare disc 52, and the recess section 82 serving to house the 8 cm-diameter bare disc 53. FIG. 16 shows the tray in an empty condition where neither the cartridge 51, nor the bare discs 52 and 53 are mounted. Conversely, FIG. 17 shows the tray with the 12 cm-diameter bare disc 52 mounted. FIG. 18 shows the tray with the 8 cm-diameter bare disc 53 mounted.

Figure 19:
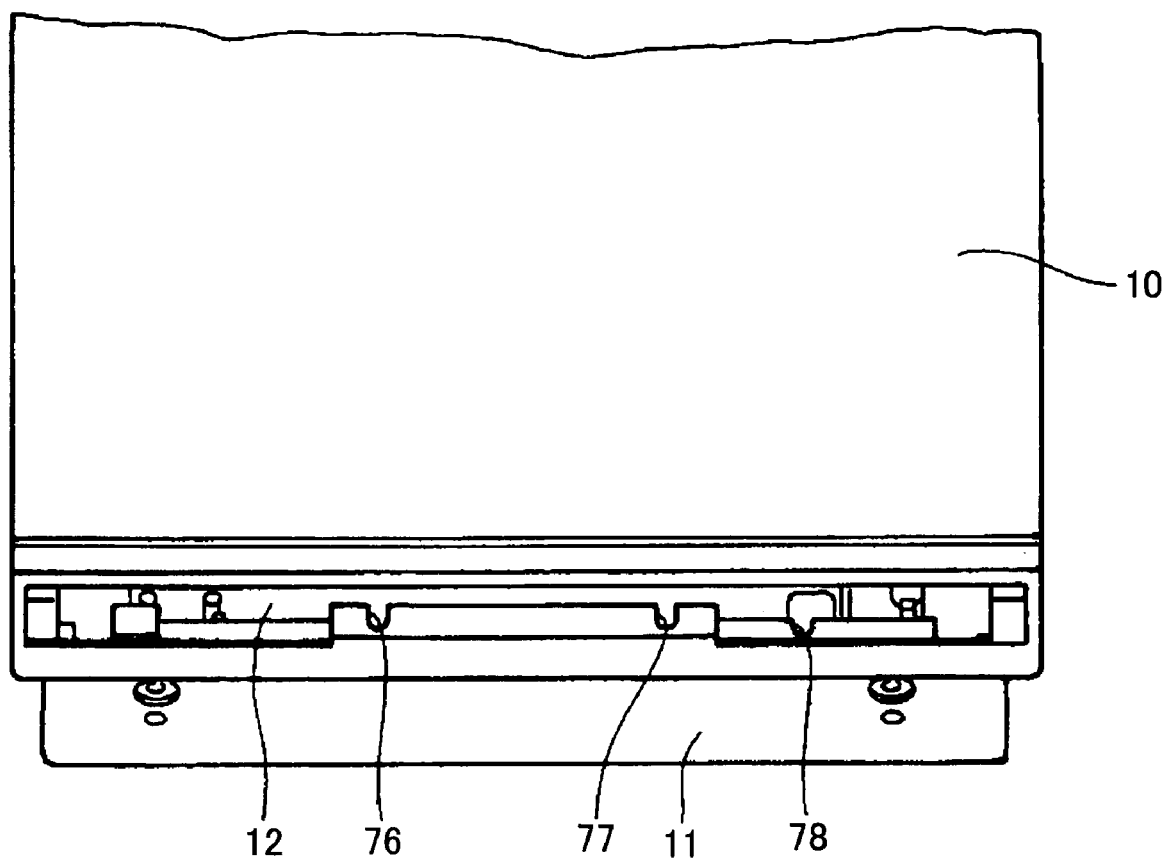
FIG. 19 is a perspective view of a front panel in a state where a tray is detached as seen from obliquely above.
Figure 20:
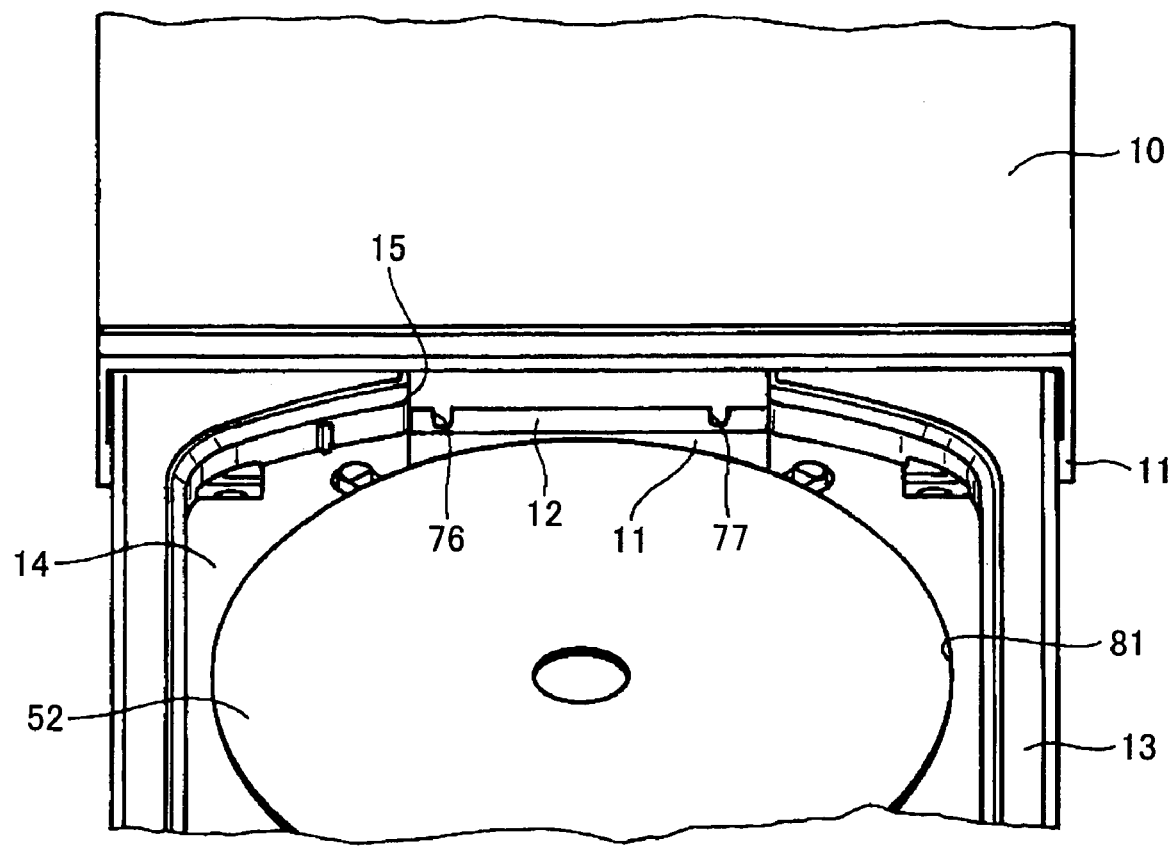
FIG. 20 is a relevant perspective view of a state where a tray is pulled from an oblong aperture of a front panel.

As shown in FIGS. 19 and 20, the detection sections 71 and 72 serving to detect respectively the left and the right sides of the bare discs 52 and 53, and the U-shaped cutouts 76 and 77 formed in correspondence with the detection sections 71 and 72 are particularly so arranged as to be laterally symmetrical about the center of the tray 13, more specifically, a centerline extending in the pull-in direction and going through the center of the recess sections 81 and 82. Thus, when the mounted 12 cm-diameter bare disc 52 is properly in the recess section 81 as shown in FIG. 20, for instance, the pair of detection sections 71 and 72 carry out the detection operation through the U-shaped cutouts 76 and 77 at the approximately same time. The detection operation in this case is equivalent to one that meets a pattern 1 shown in FIG. 25.

The detection section 73 is supposed to detect the lack portion 62 of the reflective foil 60 put on the back surface of the tray 13 approximately in synchronization with the detection operation with the detection sections 71 and 72, in which case, when the detection operation is attained with the pair of detection sections 71 and 72 at the same timing as the detection of a non-reflection with the detection section 73 through the lack portion 62 of the reflective foil 60, there is given the judgment that the 12 cm-diameter bare disc 52 is in the properly mounted condition.

The same is also applied to the case of the 8 cm-diameter bare disc 53, in which case, when the mounted 8 cm-diameter bare disc 53 is properly in the recess section 82 of the tray 13, the pair of left and right detection sections 71 and 72 carry out the detection operation at the approximately same time. Besides, at the time of the above detection operation, the detection of a non-reflection condition is carried out through the lack portion 61 put on the lower surface of the tray 13. In other words, with the detection section 73 carrying out the detection of the lack portion 61, the detection of an edge of the bare disc 53, when carried out with the pair of detection sections 71 and 72 at the approximately same timing, is supposed to provide a condition that meets a pattern 2 shown in FIG. 25. In other words, a proper arrangement of the 8 cm-diameter bare disc 53 is detected by a detection output change of the detection sections 71 and 72 from a high level to a low level in a condition where the detection section 73 provides the high level detection output.

Figure 21:
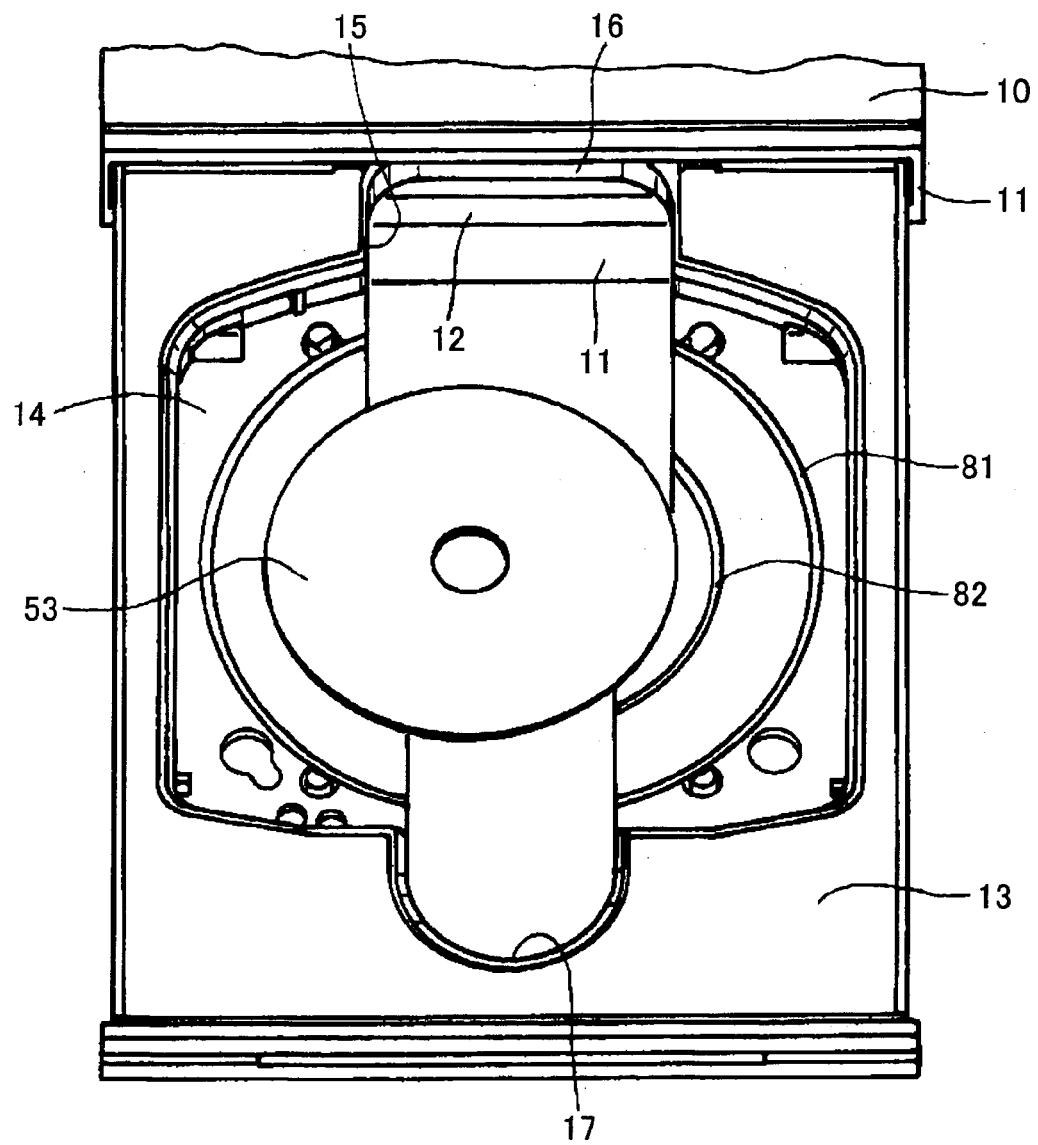
FIG. 21 is a relevant perspective view of a tray in a state where a bare disc is mounted on the tray to be misaligned to the side.
Figure 22:
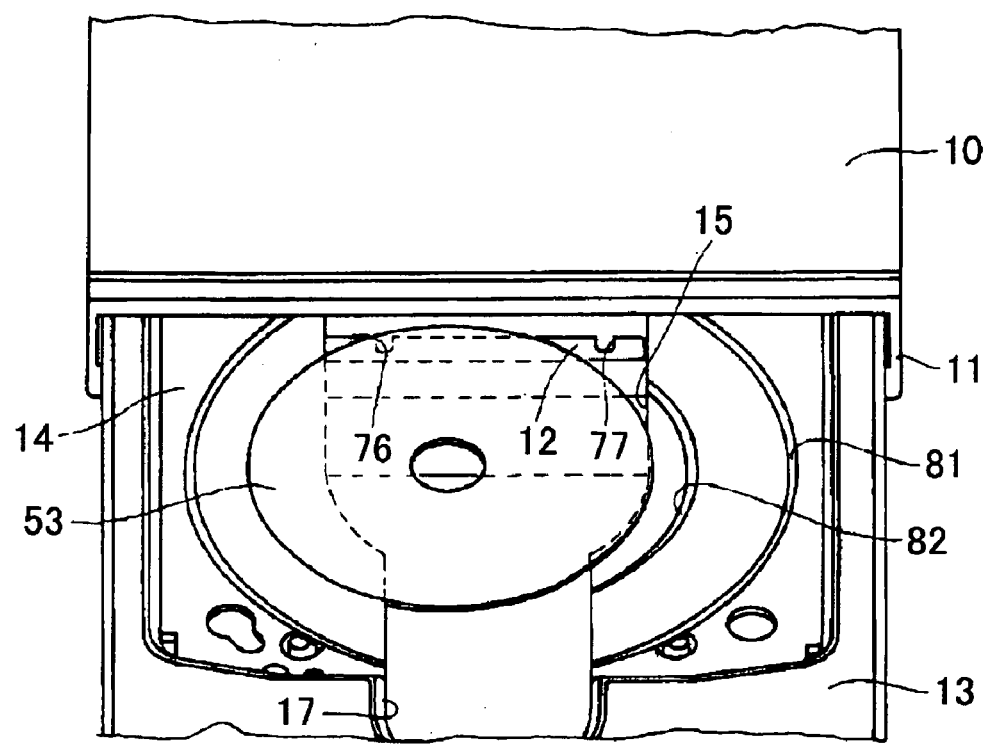
FIG. 22 is an enlarged relevant perspective view of a tray in a state where a bare disc is mounted on the tray to be misaligned to the side.
Figure 25:
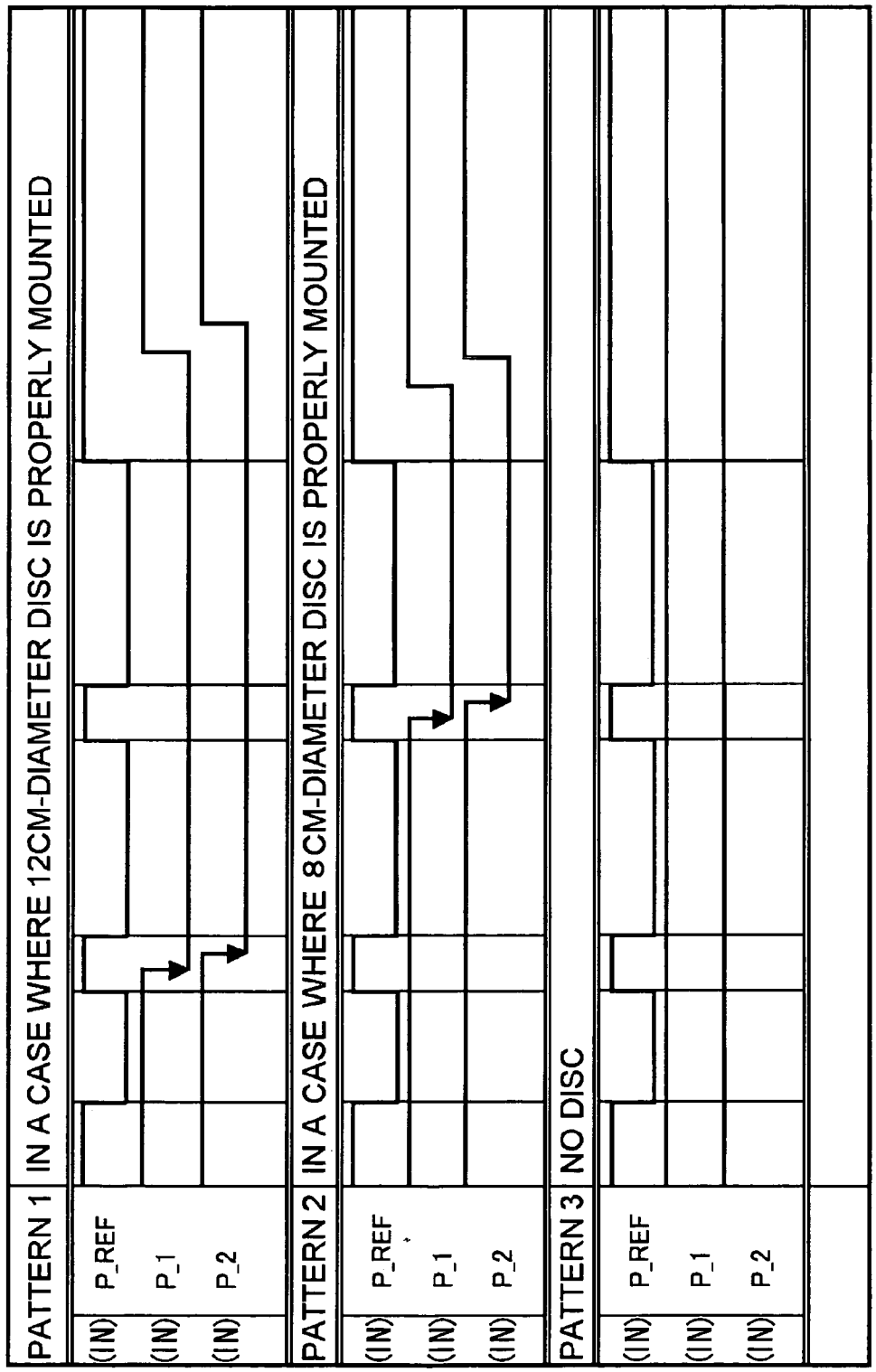
FIG. 25 is a graph showing a timing of detection.

Conversely, as shown in FIGS. 21 and 22, when the 8 cm-diameter bare disc 53, for instance, is mounted in misalignment either in a left or a right direction of the tray 13, for instance, leftward so that no proper matching of the bare disc 53 with the recess section 82 is provided, the detection operation as shown in the pattern 2 of FIG. 25 does not take place. This is because the pulling of the tray 13 in, when carried out in the condition shown in FIG. 21, causes the left detection section 71 to start the detection operation through the left cutout 76, for instance, earlier than a proper timing as shown in FIG. 22. This detection operation with the detection section 71 is carried out earlier than the detection of the lack portion 61 with the detection section 73. Then, the detection operation with the right detection section 72 follows after a passage of the detection section 73 through the lack portion 61. Thus, an improper mounting operation of the 8 cm-diameter bare disc 53 is detected based on both a difference in timing between the detection sections 71 and 72, and the detection carried out at the timing different from that of the detection operation with the detection section 73.

The controller 65 shown in FIG. 25 is operated in linkage with the above detection to discontinue the operation of the motor 19 serving to lead the tray 13 in, and conversely, to eject the tray 13, thereby eliminating the troubles.

Figure 24:
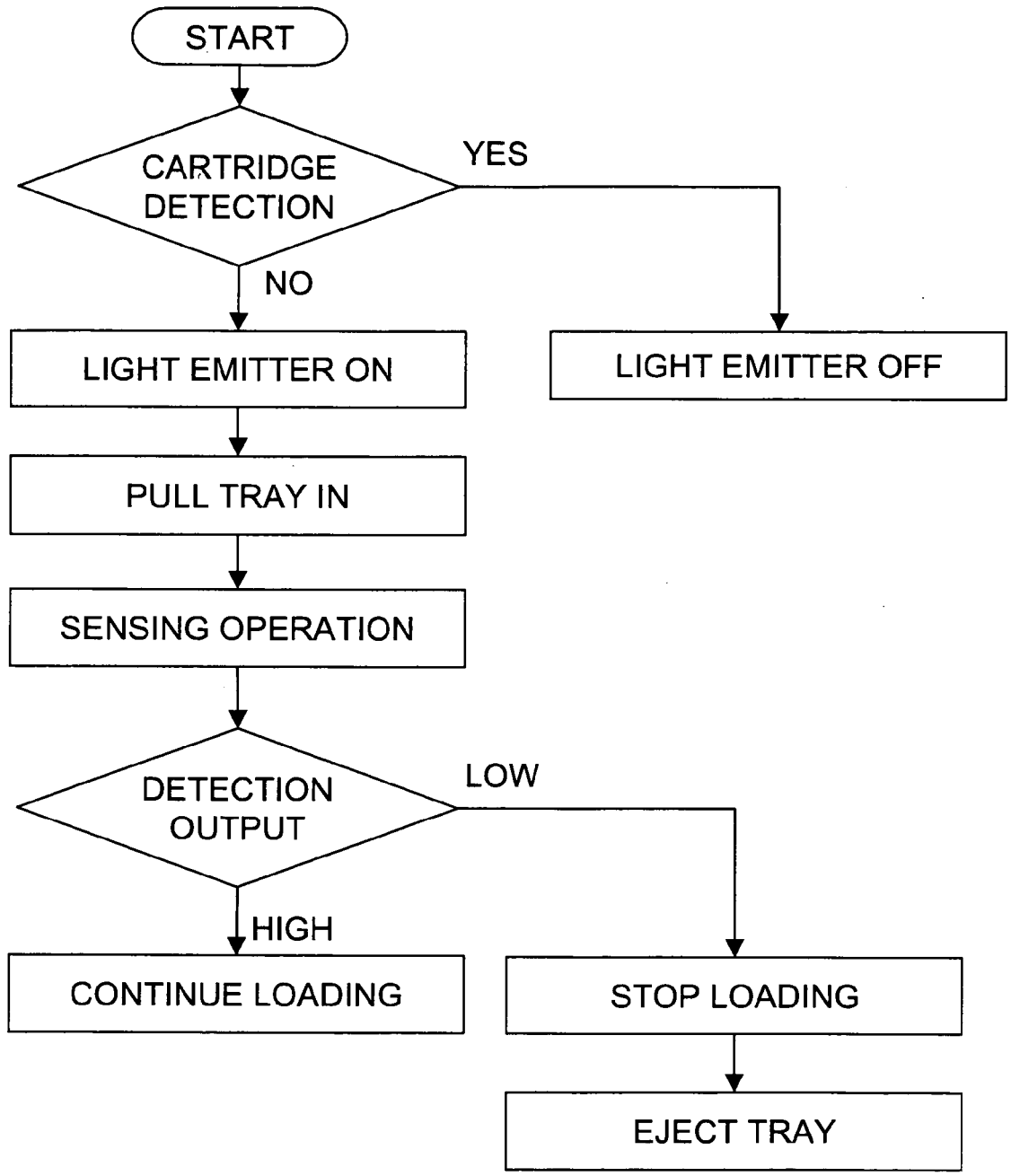
FIG. 24 is a flow chart showing a control operation of a system.

As shown in FIG. 24, a CPU of the controller 65 reads the detection output from the switch 66 serving to detect the cartridge 51, and then performs the detection operation as to whether or not the cartridge 51 is mounted. Then, when the cartridge 51 is detected, the CPU discontinues a light emitting operation of all the light emission elements 71*b*, 72*b*, and 73*b*. Conversely, when the switch 66 is in OFF position, the CPU sets all the light emission elements 71*b*, 72*b*, and 73*b* to an ON state. Then, in this state, the CPU drives the motor 19 to start the operation of pulling the tray 13 in. This provides the detection operation with the three detection sections 71, 72, and 73. In the above detection operation, when the detection operation with the detection sections 71 and 72 is attained in the condition where the detection section 73 provides the low level output, the CPU discontinues a loading by giving the judgment that the bare discs 52 and 53 are misaligned. Further, the controller 65 revolves the motor 19 in a reverse direction to eject the tray 13. Conversely, when the detection operation with the detection sections 71 and 72 is attained in the condition where the detection section 73 provides the high level output, the CPU continues the loading by giving the judgment that the bare discs are in the normally mounted condition.

While the present invention included in the present application has been described with reference to the illustrated embodiment, it is to be understood that the present invention is not limited to the above embodiment, and various changes may be made within the scope of a technical concept of the present invention included in the present application. For instance, various changes in designs about the mounting positions of the detection sections 71, 72, and 73, or the detection operation etc. with the above detection sections may be made.

INDUSTRIAL APPLICABILITY

The principal invention of the present application provides, in the apparatus configured to load the disc-shaped recording medium at the recording/reproducing position and to perform the recording and/or the reproducing with the head, on the moving path serving to load the disc-shaped recording medium, the pair of detection means so as to be positioned at both sides of the moving path of the center of the disc-shaped recording medium, permitting the detection means to detect whether or not the mounted disc-shaped recording medium is present, and whether or not the center of the disc-shaped recording medium is misaligned sideward from the moving path.

Thus, according to the disc-type recording and/or reproducing apparatus as described the above, when the mounted disc-shaped recording medium is misaligned sideward from the moving path of the center of the disc-shaped recording medium, this mounting condition of the disc-shaped recording medium may be detected surely depending on the difference in timing between the pair of detection means, preventing the disc-shaped recording medium from being mounted particularly as the disc-shaped recording medium is misaligned sideward.

Another principal invention of the present application provides, in the apparatus configured to mount the disc-shaped recording medium at the recording/reproducing position by pulling the tray on which the disc-shaped recording medium is mounted and to perform the recording and/or the reproducing with the head, the tray detection means for detecting the predetermined portion of the tray, and the disc detection means for detecting the disc-shaped recording medium on the pull-in path of the tray.

Thus, according to the disc-shaped recording and/or reproducing apparatus as described the above, the troubles involved in the pull-in operation, when carried out with the disc-shaped recording medium mounted improperly at the predetermined position of the tray, may be prevented.

The principal invention relating to the judging method provides that in the apparatus configured to mount the disc-shaped recording medium at the recording/reproducing position by pulling the tray on which the disc-shaped recording medium is mounted and to perform the recording and/or the reproducing with the head, tray detection means for detecting a target section of detection provided at a predetermined position of the tray; and disc detection means for detecting the disc-shaped recording medium on the tray, on a peripheral edge of the opening, for pulling the ray in, on a front panel, judging, depending on the combination of the detection output from the tray detection section and the detection output from the disc detection section at the time when the tray is pulled in, the size of the disc-shaped recording medium, or whether or not the disc-shaped recording medium is in the correctly mounted condition.

Thus, according to the method of judging the recording medium as described the above, the size of the disc-shaped recording medium, or whether or not the disc-shaped recording medium is in the correctly mounted condition may be surely detected depending on the combination of the detection output from the tray detection section and the detection output from the disc detection section.

The invention claimed is:

1. A disc-type recording and/or reproducing apparatus configured to load a disc-shaped recording medium at a recording/reproducing position by pulling a tray in on which the disc-shaped recording medium is mounted, and to perform a recording and/or a reproducing with a head, characterized by including:
   on a pull-in path of the tray, tray detection means for detecting a predetermined portion of the tray; and disc detection means for detecting the disc-shaped recording medium,
      wherein the tray detection means includes a target section of detection which is provided, along the pull-in direction of the tray, at a predetermined position and the disc detection means directly detects the disc-shaped recording medium, and a combination of a detection by means of the disc detection means and a detection by means of the tray detection means allows to detect whether or not the disc-shaped recording medium is properly mounted on the tray, or of a size of the disc-shaped recording medium, and characterized in that:
      a reflective foil is attached, alone the pull-in direction of the tray, on a back surface opposite to a mounting surface for mounting the disc-shaped recording medium; a black portion is formed where the reflection foil is absent corresponding to a size of the disc-shaped recording medium; and it is judged such that the disc-shaped recording medium is properly mounted if the tray detection means detects the black portion and if the disc detection means detects the disc-shaped recording medium; while in cases other than the above, it is judged such that the disc-shaped recording medium is not properly mounted.

2. The disc-type recording and/or reproducing apparatus according to claim 1 characterized in that the tray detection means and the disc detection means are provided on a peripheral edge of an opening, of a front panel, through which the tray moves in and out.

3. The disc-type recording and/or reproducing apparatus according to claim 2 characterized in that:
   the tray detection means includes a light emitter and a light detector, and also includes a target section of detection including a reflective foil or a non-reflective portion at the tray side; and a detection operation is carried out in which the light detector detects whether or not a light emitted from the light emitter is reflected at the target section of detection.

4. The disc-type recording and/or reproducing apparatus according to claim 2 characterized in that:
   the disc detection means includes the light emitter and the light detector; and the light detector is permitted to carry out the detection operation by allowing the light emitted from the light emitter to be reflected from the disc-shaped recording medium.

5. The disc-type recording and/or reproducing apparatus according to claim 1, characterized in that:
   the disc detection means are provided in a pair to be positioned at both sides of the moving path of the center of the disc-shaped recording medium; the reflective foil is attached, along the pull-in direction of the tray, on a back surface opposite to the tray's mounting surface for mounting the disc-shaped recording medium a black portion is formed where the reflective foil is absent corresponding to a size of the disc-shaped recording medium; and it is judged such that the disc-shaped recording medium is properly mounted if the tray detection means detects the black portion and if the disc detection means detects the disc-shaped recording medium, while in cases other than the above, it is judged such that the disc-shaped recording medium is not properly mounted.

6. A disc-type recording and/or reproducing apparatus configured to load a disc-shaped recording medium at a recording/reproducing position by pulling a tray in on which the disc-shaped recording medium is mounted, and to perform a recording and/or a reproducing with a head, characterized by including:
   on a pull-in path of the tray, tray detection means for detecting a predetermined portion of the tray; and disc detection means for detecting the disc-shaped recording medium,
      wherein the tray detection means includes a target section of detection which is provided, along the pull-in direction of the tray, at a predetermined position and the disc detection means directly detects the disc-shaped recording medium, and a combination of a detection by means of the disc detection means and a detection by means of the tray detection means allows to detect whether or not the disc-shaped recording medium is properly mounted on the tray, or of a size of the disc-shaped recording medium, and characterized in that:
   the disc detection means are provided in a pair to be positioned at both sides of the moving path of the center of the disc-shaped recording medium; a reflective foil is attached, along the pull-in direction of the tray, on a back surface opposite to the tray's mounting surface for mounting the disc-shaped recording medium; a black portion is formed where the reflective foil is absent corresponding to a size of the disc-shaped recording medium; and it is judged such that the disc-shaped recording medium is properly mounted if the tray detection means detects the lack portion and if the disc detection means detects the disc-shaped recording medium, while in cases other than the above, it is judged such that the disc-shaped recording medium is not properly mounted.

7. The disc-type recording and/or reproducing apparatus according to claim 2, characterized in that the tray detection means and the disc detection means are provided on a peripheral edge of an opening of a front panel, through which the tray moves in and out.

8. The disc-type recording and/or reproducing apparatus according to claim 7 characterized in that:

the tray detection means includes a light emitter and a light detector, and also includes a target section of detection including the reflective foil or a non-reflective portion at the tray side; and a detection operation is carried out in which the light detector detects whether or not a light emitted from the light emitter is reflected at the target section of detection.

9. The disc-type recording and/or reproducing apparatus according to claim 7 characterized in that:

the disc detection means includes the light emitter and the light detector; and the light detector is permitted to carry out the detection operation by allowing the light emitted from the light emitter to be reflected from the disc-shaped recording medium.

10. The disc-type recording and/or reproducing apparatus according to claim 6, further characterized in that:

a reflective foil is attached, along the pull-in direction of the tray, on a back surface opposite to a mounting surface for mounting the disc-shaped recording medium; a lack portion is formed where the reflection foil is absent corresponding to a size of the disc-shaped recording medium; and it is judged such that the disc-shaped recording medium is properly mounted if the tray detection means detects the lack portion and if the disc detection means detects the disc-shaped recording medium; while in cases other than the above, it is judged such that the disc-shaped recording medium is not properly mounted.

11. A disc-type recording and/or reproducing apparatus configured to load a disc-shaped recording medium at a recording/reproducing position by pulling a tray in on which the disc-shaped recording medium is mounted, and to perform a recording and/or a reproducing with a head, characterized by including:

on a pull-in path of the tray, tray detection means for detecting a predetermined portion of the tray; and disc detection means for detecting the disc-shaped recording medium, wherein the tray detection means includes a target section of detection which is provided, along the pull-in direction of the tray, at a predetermined position and the disc detection means directly detects the disc-shaped recording medium, and a combination of a detection by means of the disc detection means and a detection by means of the tray detection means allows to detect whether or not the disc-shaped recording medium is properly mounted on the tray, or of a size of the disc-shaped recording medium, characterized in that the tray detection means and the disc detection means are located on a peripheral edge of an opening, for leading the tray in, at a front panel, and further characterized in that:

the tray detection means includes a light emitter and a light detector, and also includes a target section of detection including a reflective or a non-reflective portion at the tray side; and a detection operation is carried out in which the light detector detects whether or not a light emitted from the light emitter is reflected at the target section of detection.

12. The disc-type recording and/or reproducing apparatus according to claim 11 characterized in that:

the disc detection means includes the light emitter and the light detector; and the light detector is permitted to carry out the detection operation by allowing the light emitted from the light emitter to be reflected from the disc-shaped recording medium.

13. The disc-type recording and/or reproducing apparatus according to claim 11 characterized in that:

a reflective foil is attached, along the pull-in direction of the tray, on a back surface opposite to a mounting surface for mounting the disc-shaped recording medium; a lack portion is formed where the reflection foil is absent corresponding to a size of the disc-shaped recording medium; and it is judged such that the disc-shaped recording medium is properly mounted if the tray detection means detects the lack portion and if the disc detection means detects the disc-shaped recording medium; while in cases other than the above, it is judged such that the disc-shaped recording medium is not properly mounted.

14. The disc-type recording and/or reproducing apparatus according to claim 11 characterized in that:

the disc detection means are provided in a pair to be positioned at both sides of the moving path of the center of the disc-shaped recording medium; a reflective foil is attached, along the pull-in direction of the tray, on a back surface opposite to the tray's mounting surface for mounting the disc-shaped recording medium; a lack portion is formed where the reflective foil is absent corresponding to a size of the disc-shaped recording medium; and it is judged such that the disc-shaped recording medium is properly mounted if the tray detection means detects the lack portion and if the disc detection means detects the disc-shaped recording medium, while in cases other than the above, it is judged such that the disc-shaped recording medium is not properly mounted.

* * * * *

UNITED STATES PATENT AND TRADEMARK OFFICE
CERTIFICATE OF CORRECTION

PATENT NO.        : 7,191,455 B2
APPLICATION NO.   : 10/532973
DATED             : March 13, 2007
INVENTOR(S)       : Morihiro Murata It is certified that error appears in the above-identified patent and that said Letters Patent is hereby corrected as shown below:

Column 12, Line 29:
"medium" should read -- medium; --.

Column 12, Line 29:
"black" should read -- lack --.

Column 12, Line 34:
"black" should read -- lack --.

Column 12, Line 65:
"black" should read -- lack --.

Signed and Sealed this

Thirty-first Day of July, 2007

JON W. DUDAS
*Director of the United States Patent and Trademark Office*